(12) United States Patent
Gendai

(10) Patent No.: US 9,729,807 B2
(45) Date of Patent: Aug. 8, 2017

(54) IMAGE SENSOR, DRIVING METHOD, AND ELECTRONIC APPARATUS

(71) Applicant: Sony Corporation, Tokyo (JP)

(72) Inventor: Yuji Gendai, Kanagawa (JP)

(73) Assignee: Sony Corporation, Tokyo (JP)

( * ) Notice: Subject to any disclaimer, the term of this patent is extended or adjusted under 35 U.S.C. 154(b) by 343 days.

(21) Appl. No.: 14/597,767

(22) Filed: Jan. 15, 2015

(65) Prior Publication Data

US 2015/0208008 A1    Jul. 23, 2015

(30) Foreign Application Priority Data

Jan. 22, 2014    (JP) .................................. 2014-009179

(51) Int. Cl.
*H01L 27/00* (2006.01)
*H04N 5/369* (2011.01)
*H04N 5/378* (2011.01)

(52) U.S. Cl.
CPC ........... *H04N 5/3698* (2013.01); *H04N 5/378* (2013.01)

(58) Field of Classification Search
CPC ..... H04N 5/378; H04N 5/3741; H04N 5/3698
See application file for complete search history.

(56) References Cited

U.S. PATENT DOCUMENTS

2006/0238634 A1\* 10/2006 Yan ...................... H04N 5/3598
348/308

FOREIGN PATENT DOCUMENTS

JP            2011-234243 A      11/2011

\* cited by examiner

*Primary Examiner* — Thanh Luu
(74) *Attorney, Agent, or Firm* — Sheridan Ross P.C.

(57) ABSTRACT

An image sensor includes a capacitor, a low-impedance virtual battery, and a boost current source. The capacitor includes one end connected to a vertical signal line and the other end. The low-impedance virtual battery is connected to the other end of the capacitor and configured to detect a current flowing in the capacitor. The boost current source is configured to provide a boost current to the vertical signal line, the boost current being a current corresponding to the current flowing in the capacitor.

11 Claims, 15 Drawing Sheets

IMAGE SENSOR, DRIVING METHOD, AND ELECTRONIC APPARATUS

CROSS REFERENCE TO RELATED APPLICATIONS

This application claims the benefit of Japanese Priority Patent Application JP 2014-009179 filed Jan. 22, 2014, the entire contents of which are incorporated herein by reference.

BACKGROUND

The present disclosure relates to an image sensor, a driving method, and an electronic apparatus, and more particularly, to an image sensor, a driving method, and an electronic apparatus that are capable of achieving speedup of an image sensor, for example.

There is a demand for an image sensor that has an increased number of pixels and achieves speedup, but increasing the number of pixels and achieving speedup are in a trade-off relationship.

In other words, in order to achieve the speedup of the image sensor, for example, it is necessary to short a settling time of a voltage of a VSL (Vertical Signal Line) (hereinafter, also referred to as VSL voltage), the voltage varying according to a signal read out from a pixel.

On the other hand, in the case of increasing the number of pixels of the image sensor, a parasitic capacitance of a VSL for transferring signals read out from pixels arranged in a column direction increases. This increase of the parasitic capacitance hinders the shortening of the settling time of the VSL voltage.

In order to shorten the settling time of the VSL voltage, it is effective to increase a current provided by a current source, together with which an amplifier transistor that forms a pixel forms a source follower.

However, since the VSL has the parasitic capacitance, the current provided by the current source, which forms the source follower, decreases by an amount of a current flowing in the VSL from the parasitic capacitance. As a result, the shortening of the settling time of the VSL voltage is hindered.

In this regard, the applicant of the subject application has previously proposed a technique to shorten the settling time of the VSL voltage, that is, to achieve the speedup of the image sensor (solid-state imaging device) by adding a circuit (load element unit) that increases a current flowing in the VSL by an amount of a current flowing in the VSL from the parasitic capacitance (see Japanese Patent Application Laid-open No. 2011-234243).

SUMMARY

To achieve the speedup of the image sensor, that is, to shorten the settling time of the VSL voltage, it is desirable to reduce a mounting area of a circuit to be added to the image sensor as much as possible.

In view of the circumstances as described above, there is a need for achieving the speedup of an image sensor while suppressing an increase in mounting area.

According to an embodiment of the present disclosure, there is provided an image sensor including: a capacitor including one end connected to a vertical signal line and the other end; a low-impedance virtual battery connected to the other end of the capacitor and configured to detect a current flowing in the capacitor; and a boost current source configured to provide a boost current to the vertical signal line, the boost current being a current corresponding to the current flowing in the capacitor.

According to another embodiment of the present disclosure, there is provided a driving method for an image sensor, the image sensor including a capacitor and a low-impedance virtual battery, the capacitor including one end connected to a vertical signal line and the other end, the low-impedance virtual battery being connected to the other end of the capacitor and configured to detect a current flowing in the capacitor, the driving method including providing a boost current to the vertical signal line, the boost current being a current corresponding to the current flowing in the capacitor.

According to another embodiment of the present disclosure, there is provided an electronic apparatus including: an optical system configured to condense light; and an image sensor configured to receive light and capture an image, the image sensor including a capacitor including one end connected to a vertical signal line and the other end, a low-impedance virtual battery connected to the other end of the capacitor and configured to detect a current flowing in the capacitor, and a boost current source configured to provide a boost current to the vertical signal line, the boost current being a current corresponding to the current flowing in the capacitor.

According to the present disclosure, in the low-impedance virtual battery connected to the other end of the capacitor including the one end connected to the vertical signal line, a current flowing in the capacitor is detected. The boost current that is a current corresponding to the current flowing in the capacitor is provided to the vertical signal line.

According to the present disclosure, it is possible to achieve the speedup of the image sensor. In particular, for example, it is possible to achieve the speedup of the image sensor while suppressing an increase in mounting area.

It should be noted that the effects described above are not necessarily restrictive and may be any of those described in the present disclosure.

These and other objects, features and advantages of the present disclosure will become more apparent in light of the following detailed description of best mode embodiments thereof, as illustrated in the accompanying drawings.

DETAILED DESCRIPTION OF EMBODIMENTS

Digital Camera According to Embodiment of Present Disclosure

Figure 1:
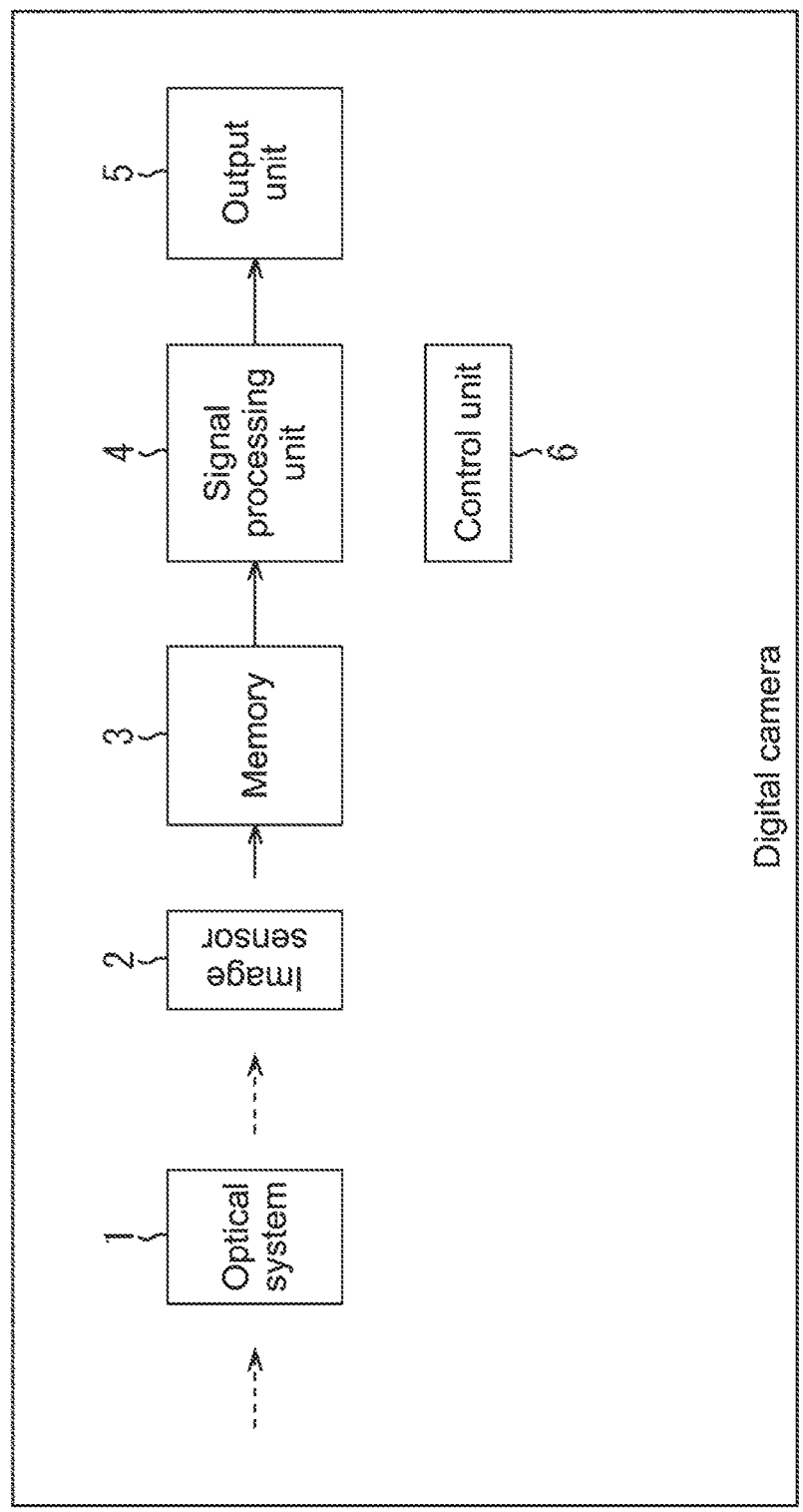
FIG. 1 is a block diagram showing an exemplary configuration of a digital camera according to an embodiment of the present disclosure.

FIG. 1 is a block diagram showing an exemplary configuration of a digital camera according to an embodiment of the present disclosure.

It should be noted that the digital camera is capable of capturing both still and moving images.

In FIG. 1, the digital camera includes an optical system 1, an image sensor 2, a memory 3, a signal processing unit 4, an output unit 5, and a control unit 6.

The optical system 1 includes a zoom lens, a focus lens, an aperture, and the like (not shown) and inputs external light into the image sensor 2.

The image sensor 2 is a CMOS (Complementary Metal Oxide Semiconductor) image sensor, for example. The image sensor 2 receives light input from the optical system 1 and performs photoelectric conversion to output image data corresponding to the light from the optical system 1.

The memory 3 temporarily stores the image data output by the image sensor 2.

The signal processing unit 4 performs signal processing using the image data stored in the memory 3, e.g., noise removal and white balance adjustment. The signal processing unit 4 supplies the resulting image data to the output unit 5.

The output unit 5 outputs the image data supplied from the signal processing unit 4.

In other words, the output unit 5 includes a display (not shown) formed of liquid crystal or the like and displays an image corresponding to the image data supplied from the signal processing unit 4 as a so-called through image.

Further, the output unit 5 includes a driver (not shown) that drives a recording medium such as a semiconductor memory, a magnetic disc, and an optical disc, and records the image data from the signal processing unit 4 on the recording medium.

The control unit 6 controls the blocks of the digital camera according to a user's operation or the like.

In the digital camera configured as described above, the image sensor 2 receives light, which is input from the optical system 1, and outputs image data in accordance with the input light.

The image data output from the image sensor 2 is supplied to the memory 3 for storage therein. The image data stored in the memory 3 is then subjected to signal processing by the signal processing unit 4, and the resulting image data is supplied to the output unit 5 for output therefrom.

Exemplary Configuration of Image Sensor 2

Figure 2:
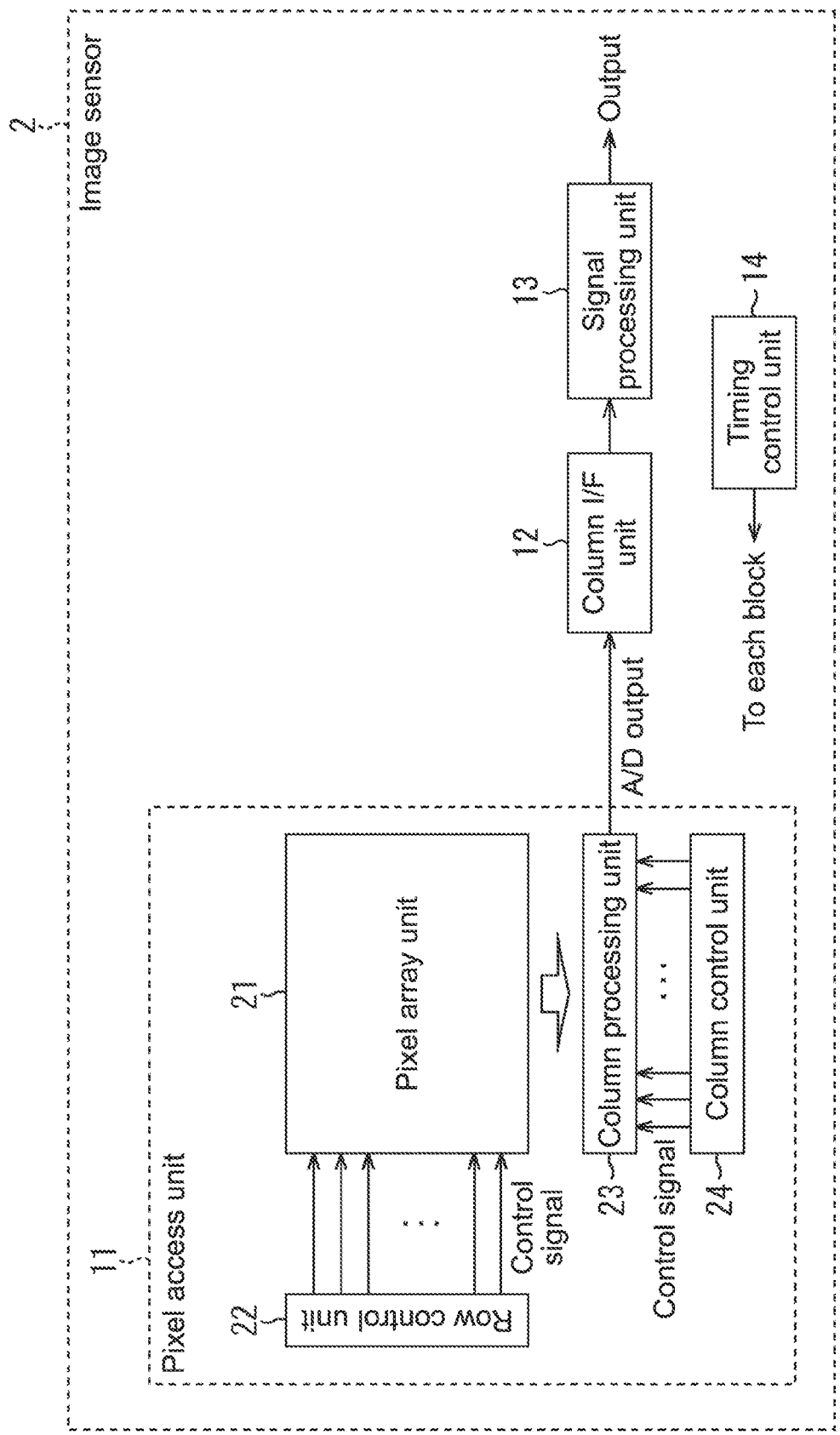
FIG. 2 is a block diagram showing an exemplary configuration of an image sensor.

FIG. 2 is a block diagram showing an exemplary configuration of the image sensor 2 of FIG. 1.

In FIG. 2, the image sensor 2 includes a pixel access unit 11, a column I/F (Interface) unit 12, a signal processing unit 13, and a timing control unit 14.

The pixel access unit 11 includes pixels where photoelectric conversion is performed, and accesses the pixels to acquire pixel values that serve as image data. The pixel access unit 11 then outputs the pixel values.

In other words, the pixel access unit 11 includes a pixel array unit 21, a row control unit 22, a column processing unit 23, and a column control unit 24.

The pixel array unit 21 includes a plurality of pixels that are two-dimensionally arranged in an orderly manner. The plurality of pixels output electric signals by photoelectric conversion.

Under the control of the row control unit 22, the pixel array unit 21 reads out the electric signals from the pixels, which form the pixel array unit 21, on a row basis, for example, and supplies the electric signals to the column processing unit 23.

The row control unit 22 performs access control for reading out the electric signals from the pixels of the pixel array unit 21.

The column processing unit 23 performs processing of AD (Analog-to-Digital) conversion or the like on the electric signals (voltage) supplied from the pixel array unit 21 on a row basis, for example, and supplies the resulting digital signals to the column I/F unit 12 as pixel values.

The column control unit 24 performs column control for supplying (outputting), to the column I/F unit 12, the pixel values obtained by the processing of the column processing unit 23.

The column I/F unit 12 temporarily stores the pixel values supplied from (the column processing unit 23 of) the pixel access unit 11, to function as an interface for receiving the pixel values.

The signal processing unit 13 performs predetermined signal processing on the pixel values read out from the pixel access unit 11 and stored in the column I/F unit 12, and outputs the resulting pixel values to the outside of the image sensor 2, e.g., to the memory 3 (FIG. 1).

The timing control unit 14 generates a timing signal for controlling an operation timing of each of the blocks that form the image sensor 2, and supplies the timing signal to an appropriate block.

Figure 3:
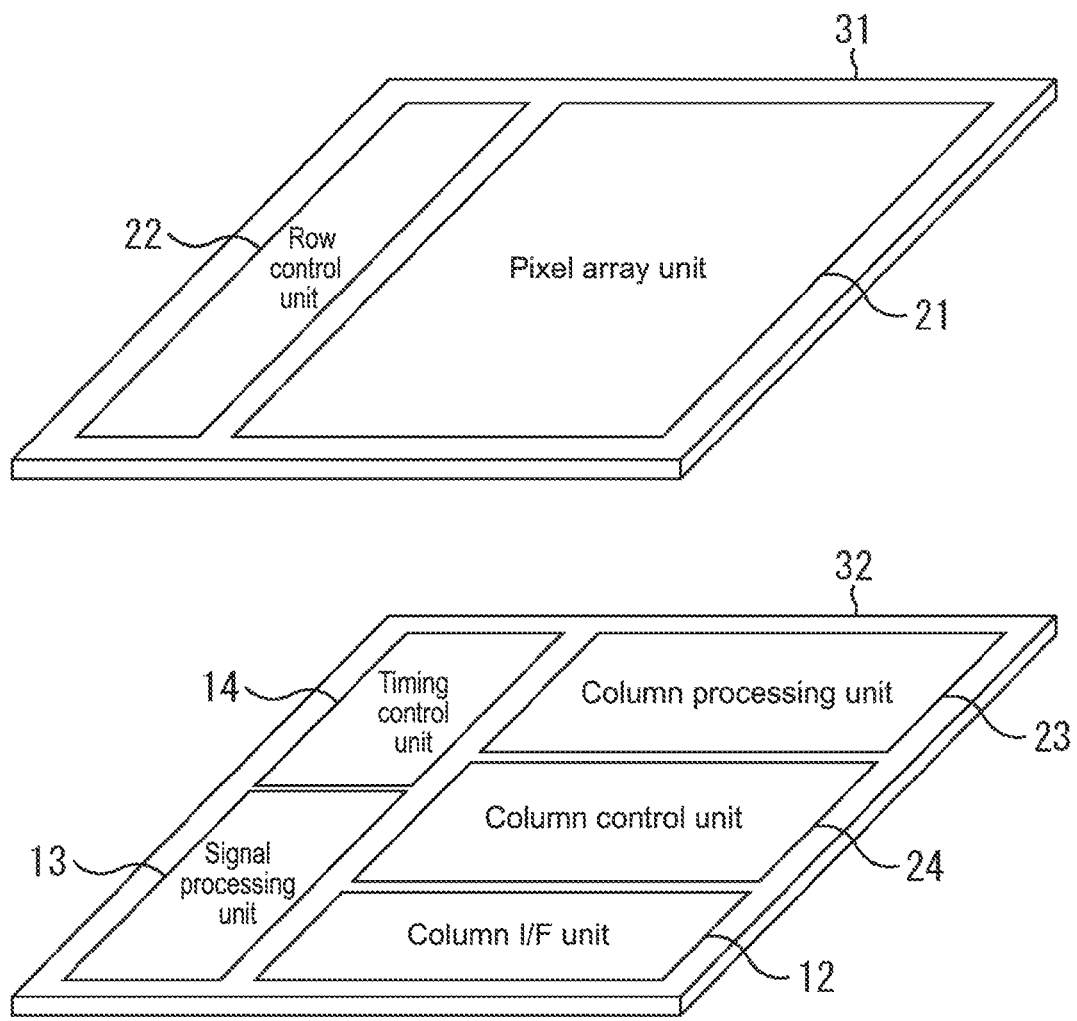
FIG. 3 is a perspective view showing an exemplary configuration of the image sensor.

FIG. 3 is a perspective view showing an exemplary configuration of the image sensor 2 of FIG. 1.

The image sensor 2 can be formed of one substrate (die) or two substrates vertically stacked on each other.

FIG. 3 is a perspective view showing an exemplary configuration of the general outline of two substrates in the case where the image sensor 2 is formed of those two substrates vertically stacked on each other.

In FIG. 3, the pixel array unit 21 and the row control unit 22 are formed on an upper substrate 31, which is stacked on the upper side, of the two substrates vertically stacked on each other.

Further, in FIG. 3, the column I/F unit 12, the signal processing unit 13, the timing control unit 14, the column processing unit 23, and the column control unit 24 are formed on the other lower substrate 32, which is stacked on the lower side, of the two substrates.

The image sensor 2 includes the upper substrate 31 and lower substrate 32 stacked on each other as described above, and thus can be formed as a stacked image sensor of one chip.

Exemplary Configuration of Pixel Array Unit 21 and Column Processing Unit 23

Figure 4:
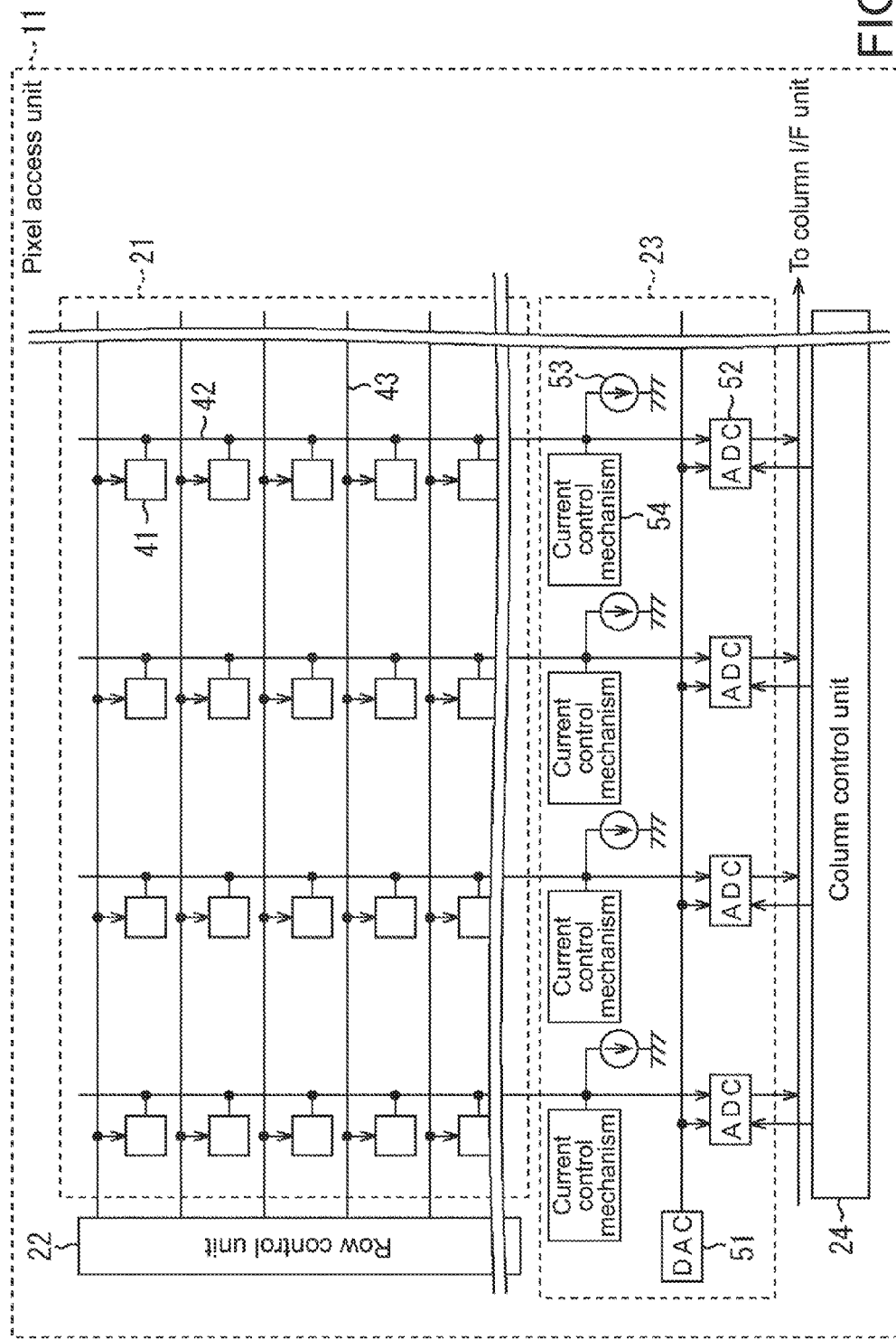
FIG. 4 is a block diagram showing an exemplary configuration of a pixel array unit and a column processing unit.

FIG. 4 is a block diagram showing an exemplary configuration of the pixel array unit 21 and the column processing unit 23 of FIG. 2.

The pixel array unit 21 includes two or more pixel units 41 arranged two-dimensionally and regularly, that is, arranged in a matrix, for example.

The pixel unit 41 includes a pixel that outputs an electric signal by photoelectric conversion. The details will be described later.

In the pixel array unit 21, one VSL 42 is disposed for each column of the pixel units 41 in a column direction (vertical direction).

The VSL 42 of each column is connected to the pixel units 41 of the respective rows connected to that column and also connected to the column processing unit 23. The electric signals read out from the pixel units 41 are supplied (transferred) to the column processing unit 23 via the VSL 42.

In the pixel array unit 21, a row signal line 43 is disposed for each row of the pixel units 41 in a row direction (horizontal direction) and connected to the row control unit 22 and the pixel units 41.

The row control unit 22 drives the row signal lines 43, that is, supplies (provides) control signals to the row signal lines 43, to thus control the pixel units 41 connected to those row signal lines 43. By the control of the pixel units 41 by the row control unit 22, the electric signals to serve as pixel values are read out from the pixel units 41 on a row basis.

The column processing unit 23 includes a DAC (Digital Analog Converter) 51, X AD converters (ADCs) 52, X current sources 53, and X current control mechanisms 54 as many as the number X of columns (VSLs 42) of the pixel units 41 that form the pixel array unit 21.

The DAC 51 performs DA (Digital-to-Analog) conversion to thus generate an analog reference signal for supply to the ADCs 52. The analog reference signal has a period of a level change from a predetermined initial value to a predetermined final value with a fixed slope like a ramp signal, for example.

The x-th (x=1, 2, . . . , X) ADC 52 of the X ADCs 52 is connected to the VSL 42 of the x-th column. The electric signals read out from the pixel units 41 in the respective rows connected to the x-th column are sequentially supplied to the x-th ADC 52 via the VSL 42 in the x-th column.

The ADC 52 compares the electric signals supplied from the pixel units 41 via the VSL 42 with the reference signal supplied from the DAC 51, and counts time spent on a level change of the reference signal until the levels of those electric signals and the reference signal are matched. Thus, the ADC 52 performs AD conversion or the like on the electric signals supplied from the pixel units 41.

The ADC 52 outputs the pixel values, which are digital electric signals obtained as a result of the AD conversion or the like, to the column I/F unit 12 (FIG. 2) in accordance with the control of the column control unit 24.

It should be noted that for the ADCs 52, for example, X/2 ADCs can be provided. X/2 is smaller than X, which is the number of columns of the pixel units 41. In this case, the pixel units 41 in the (2x−1)-th column are connected to the x-th ADC 52 via the VSL 42 in the (2x−1)-th column, and the pixel units 41 in the 2x-th column are connected to the x-th ADC 52 via the VSL 42 in the 2x-th column.

The x-th ADC 52 handles the AD conversion or the like of the electric signals on the pixel units 41 in the (2x−1)-th odd number column and the pixel units 41 in the 2x-th even number column. So, in the case where X/2 ADCs are provided as the ADCs 52, the AD conversion for the pixel units 41 in one row is performed in time division manner separately on the pixel units 41 in odd number columns and on the pixel units 41 in even number columns.

Each of the current sources 53 is grounded at one end and connected to the VSL 42 at the other end, and provides a constant current toward the ground side. The current source 53 is a current source to be a load of a FET (Field Effect Transistor) (amplifier Tr) 64 (FIG. 5) of a source follower, which serves as an amplifier transistor of the pixel unit 41 to be described later.

Here, the current source 53 can be formed of a MOS (Metal Oxide Semiconductor) FET, for example. The current source 53 formed of a MOS FET is also referred to as load MOS.

The current control mechanism 54 is connected to the VSL 42 and dynamically controls the current flowing in the VSL 42.

In the pixel access unit 11 in which the pixel array unit 21 and the column processing unit 23 are formed as described above, the electric signals are read out from the pixel units 41 in the first row in the respective columns, for example.

Voltage corresponding to the electric signals read out from the pixel units 41 is supplied to the column processing unit 23 via the VSLs 42, and AD conversion or the like is performed thereon.

Hereinafter, the same processing is performed on a row basis on the pixel units 41 in the second and subsequent rows.

Exemplary Configuration of Pixel Unit 41

Figure 5:
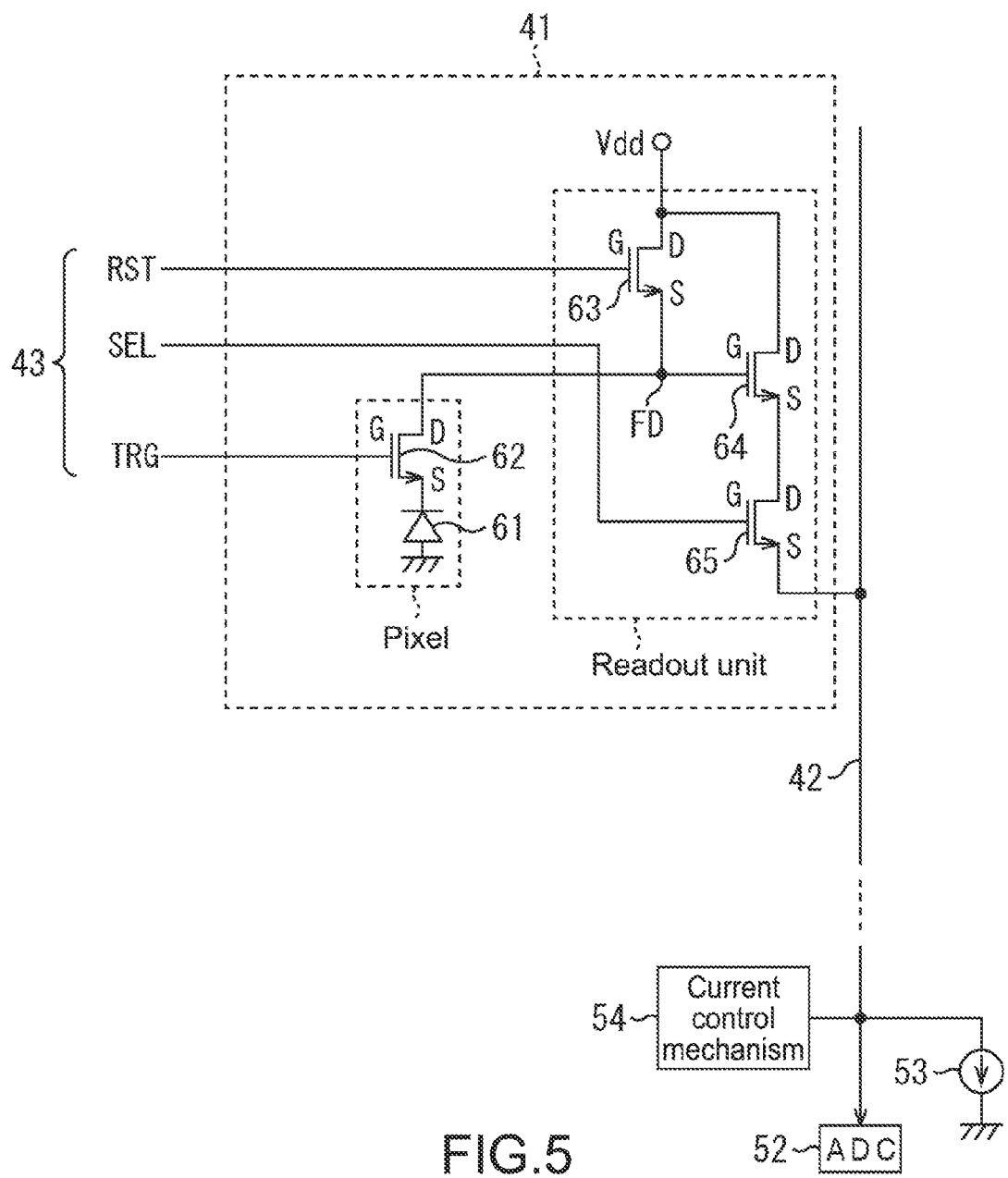
FIG. 5 is a circuit diagram showing an exemplary configuration of a pixel unit.

FIG. 5 is a circuit diagram showing an exemplary configuration of the pixel unit 41.

The pixel unit 41 of FIG. 5 includes, for example, one pixel and nMOS (negative channel MOS) FETs 63, 64, and 65.

The pixel includes a PD (Photo Diode) 61 and an nMOS FET 62 and outputs an electric signal by photoelectric conversion.

The PD 61, which is an exemplary photoelectric conversion element, receives input light and stores charge corresponding to the input light, to perform photoelectric conversion.

An anode of the PD 61 is connected to the ground (grounded), and a cathode of the PD 61 is connected to a source of the FET 62.

The FET 62 is a transistor (Tr) for transferring the charge stored in the PD 61 from the PD 61 to an FD (Floating Diffusion), and is hereinafter also referred to as transfer Tr 62.

The source of the transfer Tr 62 is connected to the cathode of the PD 61, and a drain of the transfer Tr 62 is connected to a gate of the FET 64 via the FD.

Further, a gate of the transfer Tr 62 is connected to the row signal line 43 and is supplied with a transfer pulse TRG via the row signal line 43.

Here, examples of the control signal, which is provided to the row signal line 43 in order for the row control unit 22

(FIG. 4) to control the pixel units 41 via the row signal line 43, include a reset pulse RST and a selection pulse SEL to be described later, in addition to the transfer pulse TRG.

So, as the row signal line 43, a control line through which the transfer pulse TRG, the reset pulse RST, and the selection pulse SEL flow is provided.

Additionally, the FD is an area formed at a connection point between a source of the FET 63 and the gate of the FET 64. In the FD, the charge provided thereto is converted into voltage, as in a capacitor.

The FET 63 is a transistor for resetting the charge (voltage (potential)) stored in the FD and is hereinafter also referred to as reset Tr 63.

A drain of the reset Tr 63 is connected to a power supply Vdd, and the source of the reset Tr 63 is connected to the FD.

Additionally, a gate of the reset Tr 63 is connected to the row signal line 43 and is supplied with the reset pulse RST via the row signal line 43.

The FET 64 is a transistor for buffering the voltage of the FD and is hereinafter also referred to as amplifier Tr 64.

The gate of the amplifier Tr 64 is connected to the FD, and a drain of the amplifier Tr 64 is connected to the power supply Vdd. Further, a source of the amplifier Tr 64 is connected to a drain of the FET 65.

The FET 65 is a FET for selecting output of the electric signal (voltage) to the VSL 42 and is hereinafter also referred to as selection Tr 65.

A source of the selection Tr 65 is connected to the VSL 42.

Further, a gate of the selection Tr 65 is connected to the row signal line 43 and is supplied with the selection pulse SEL via the row signal line 43.

Here, the selection Tr 65 is just a switch for electrically connecting the pixel unit 41 to the VSL 42 on a row basis in a sequential manner. Since the source of the amplifier Tr 64 is connected to the current source 53 via the selection Tr 65 serving as a mere switch and the VSL 42, the amplifier Tr 64 serves as an SF (Source Follower).

So, in the pixel unit 41, the voltage corresponding to the charge stored in the FD is supplied to the ADC 52 via the amplifier Tr 64 as a source follower.

It should be noted that the positions of the amplifier Tr 64 and the selection Tr 65 can be switched.

Additionally, the pixel unit 41 can be formed without the selection Tr 65.

In the pixel unit 41 formed as described above, the PD 61 receives light that is input thereto and performs photoelectric conversion, to thus start storing charge corresponding to the amount of the received light. Herein, for simplicity of description, it is assumed that the selection pulse SEL serving as a switch is in H level and the selection Tr 65 is in an on-state.

After the elapse of a predetermined period of time (exposure time) from the start of storing of the charge in the PD 61, the row control unit 22 (FIG. 4) temporality changes the level of the transfer pulse TRG (from (L (Low) level) to H (High) level.

The transfer pulse TRG is temporarily changed to H level, and thus the transfer Tr 62 is temporarily turned on.

When the transfer Tr 62 is turned on, the charge stored in the PD 61 is transferred to the FD via the transfer Tr 62 and stored therein.

Before temporarily changing the level of the transfer pulse TRG to H level, the row control unit 22 temporarily sets the reset pulse RST to H level and thus temporarily turns the reset Tr 63 on.

Since the reset Tr 63 is turned on, the FD is connected to the power supply Vdd via the reset Tr 63, and the charge stored in the FD is discharged to the power supply Vdd via the reset Tr 63 and then reset.

Herein, the resetting of the charge in the FD by the connection of the FD to the power supply Vdd as described above is also referred to as resetting of the pixel unit 41 (or a pixel).

After resetting of the charge in the FD, the row control unit 22 temporarily changes the level of the transfer pulses TRG to H level as described above, and thus the transfer Tr 62 is temporarily turned on.

The transfer Tr 62 is turned on, and thus the charge stored in the PD 61 is transferred to and stored in the charge-reset FD via the transfer Tr 62.

The voltage (potential) corresponding to the charge stored in the FD is output onto the VSL 42 as an electric signal via the amplifier Tr 64 and the selection Tr 65. Thus, the VSL voltage varies.

In each ADC 52 (FIG. 4) connected to the VSL 42, AD conversion is performed on a reset level, which is a VSL voltage immediately after the resetting of the pixel unit 41 is performed.

Further, in the ADC 52, AD conversion is performed on a signal level (including the reset level and a level to be a pixel value), which is a VSL voltage after the transfer Tr 62 is temporarily turned on, the VSL voltage corresponding to the charge stored in the PD 61 and transferred to the FD.

In the ADC 52, CDS (Correlated Double Sampling) is performed to obtain, as a pixel value, a difference in AD conversion result between the reset level and the signal level. An electric signal obtained as a result of the CDS is output to the column I/F unit 12 (FIG. 2) as a pixel value.

As descried above, a pixel value is read out from the pixel of the pixel unit 41.

It should be noted that in FIG. 5, the reset Tr 63, the amplifier Tr 64, the selection Tr 65, and the FD form a readout unit that reads out an electric signal from the pixel.

The pixel unit 41 of FIG. 5 adopts a unit pixel configuration in which a readout unit is used to read out an electric signal from one pixel. In contrast, a pixel sharing configuration in which a plurality of pixels are provided and a readout unit is shared to read out electric signals of the plurality of pixels can be adopted for the pixel unit 41.

For the pixel unit 41 with the pixel sharing configuration including the plurality of pixels, the transfer Trs 62 of the respective pixels are sequentially turned on, and electric signals are sequentially read out from the plurality of pixels.

Herein, for simplicity of description, description on the CDS for the readout of pixel signals, which are electric signals to be pixel values, from (the pixels of) the pixel unit 41 will be omitted hereinafter.

Parasitic Capacitance

Figure 6:
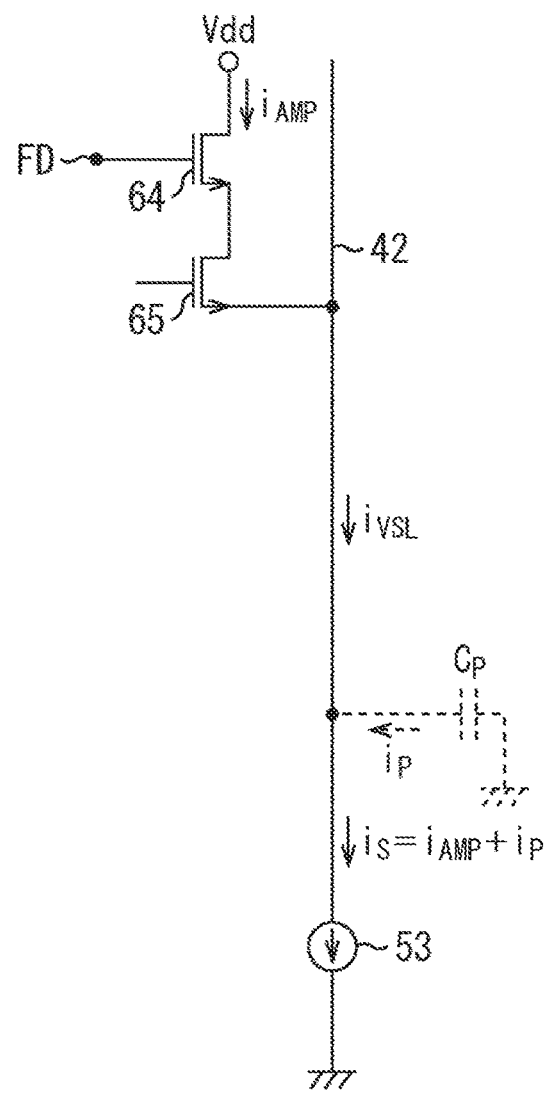
FIG. 6 is a diagram for describing a parasitic capacitance of a VSL (Vertical Signal Line)

FIG. 6 is a diagram for describing a parasitic capacitance of the VSL 42.

A parasitic capacitance $C_P$ is generated between the VSL 42 and the ground, a power source, and an adjacent line. A current $i_P$ flows in the VSL 42 from the parasitic capacitance $C_P$.

Here, a current flowing through the current source that forms a source follower together with the amplifier Tr 64 is assumed as a load MOS current $i_{MOS}$, and a current provided by the current source 53 connected to the VSL 42 is denoted by $i_S$, a VSL current that flows in the VSL 42 is denoted by $i_{VSL}$, and an operating current (drain current) of the amplifier Tr 64 is denoted by $i_{AMP}$. In FIG. 6, the load MOS current $i_{MOS}$ is a current $i_S$ provided by the current source 53.

In FIG. 6, ideally, $i_{AMP}=i_S(=i_{VSL})$. However, since the parasitic capacitance $C_P$ exists on the VSL 42 dispersedly, the VSL current $i_{VSL}$ differs depending on positions of the VSL 42 due to the current $i_P$ flowing in from the parasitic capacitance $C_P$ to the VSL 42.

The current $i_S$ of the current source 53 is equal to the sum of the operating current (hereinafter, referred to as amplifier current) $i_{AMP}$ of the amplifier Tr 64 and the current $i_P$ of the parasitic capacitance $C_P$, i.e., $i_{AMP}+i_P=i_S$.

For the speedup of the image sensor, that is, the shortening of a settling time of the VSL voltage (hereinafter, also referred to as VSL settling time), it is effective to increase the load MOS current $i_{MOS}$.

Herein, in FIG. 6, the increase of the load MOS current $i_{MOS}$ means the increase of the current $i_S$ of the current source 53.

However, when the current $i_S$ of the current source 53 is merely increased, the VSL current $i_{VSL}$ becomes constantly large.

If the VSL current $i_{VSL}$ is constantly large, the reset level decreases due to a voltage drop by wiring resistance and the like of the VSL 42 and a voltage rise between the gate and the source of the amplifier Tr 64 by an increase of the amplifier current $i_{AMP}$. This may cause a difficulty of ensuring a dynamic range of pixel value, which is requested for the image sensor 2.

So, a method of shortening the VSL settling time by merely increasing the load MOS current $i_{MOS}$, that is, the current $i_S$ of the current source 53 has limitations in relation to the ensuring of the dynamic range of pixel value, which is requested for the image sensor 2.

To shorten the VSL settling time while ensuring the dynamic range of pixel value, which is requested for the image sensor 2, that is, without decreasing the reset level, it is necessary to provide a current control mechanism that dynamically controls the load MOS current $i_{MOS}$ by dynamically controlling the current $i_S$ and the like of the current source 53, for example, not to merely increase the current $i_S$ of the current source 53.

It is desirable that the current control mechanism have low power consumption, that is, it is desirable to shorten the VSL settling time by an amount of a current consumed by the current control mechanism, as compared to the case where the current $i_S$ of the current source 53 (load MOS current $i_{MOS}$) is increased, without providing a current control mechanism.

If the VSL settling time can be shortened more in the case where the current $i_S$ of the current source 53 is increased by an amount of the current consumed by the current control mechanism without providing the current control mechanism than in the case where the current control mechanism is provided, the speedup of the image sensor 2 can be achieved with low power consumption under the condition that the current $i_S$ of the current source 53 is merely increased and a voltage drop corresponding to the increase is permissible, as compared to the case where the current control mechanism is provided.

Examples of a method of dynamically controlling the load MOS current $i_{MOS}$ (current $i_S$ of current source 53) in the current control mechanism in order to achieve the speedup of the image sensor 2 include a method of detecting an amplifier current (drain current of the amplifier Tr 64 of the pixel unit 41) $i_{AMP}$ and controlling the current $i_S$ of the current source 53 (load MOS current $i_{MOS}$) in accordance with the amplifier current $i_{AMP}$.

However, in order to detect the amplifier current $i_{AMP}$, for example, it is necessary to additionally provide wiring to each column of the pixel units 41 that are widely dispersed (disposed), the wiring being used for detecting the amplifier current $i_{AMP}$ and connected to the drain of the amplifier Tr 64. In such a case, there is a possibility that the wiring of the pixel array unit 21 is compressed.

So, in the current control mechanism, it is desirable to dynamically control the load MOS current $i_{MOS}$ (current $i_S$ of the current source 53) based on (only) information that can be acquired from the VSL 42.

In this regard, in the current control mechanism 54 (FIGS. 4 and 5) provided to the image sensor 2, the load MOS current $i_{MOS}$ is dynamically controlled in accordance with (a change in) the VSL voltage, i.e., the voltage of the VSL 42, which is information that can be acquired from the VSL 42, for example.

In other words, in the current control mechanism 54, the following control of the load MOS current $i_{MOS}$ is performed, for example. When the VSL voltage is constant, the load MOS current $i_{MOS}$ having an amount capable of ensuring the dynamic range of pixel value, which is requested for the image sensor 2, is provided and when the VSL voltage is changed (not constant), the load MOS current $i_{MOS}$ is increased such that the VSL settling time can be shortened. This allows the shortening of the VSL settling time and the speedup of the image sensor 2 without decreasing the reset level.

Here, in order to achieve the speedup of the image sensor 2, it is necessary to shorten the VSL settling time from when the VSL voltage starts changing to when the VSL voltage is settled, in accordance with the electric signals read out from the pixel units 41.

A mere increase in slew rate of the VSL voltage causes large undershoot and elongates the VSL settling time adversely. This may make it difficult to achieve the speedup of the image sensor 2.

Since the parasitic capacitance $C_P$ is relatively large, a VSL voltage change of the VSL 42 to which such a parasitic capacitance $C_P$ is connected, that is, for example, the falling of the VSL voltage is not so particularly rapid (sharp). So, it is desirable for the current control mechanism 54 to be a circuit that does not have to operate so fast but causes less delay, because the occurrence of undershoot is reduced more as less delay is caused.

Further, it is necessary for the current control mechanism 54 to control the load MOS current $i_{MOS}$ such that the VSL settling time can be shortened even in the case where the VSL voltage as an analog signal is settled at any value in the dynamic range of VSL voltage, which corresponds to the dynamic range of pixel value requested for the image sensor 2. A circuit constant of the current control mechanism 54 is selected (also) in consideration of such requests.

First Exemplary Configuration of Current Control Mechanism 54

Figure 7:
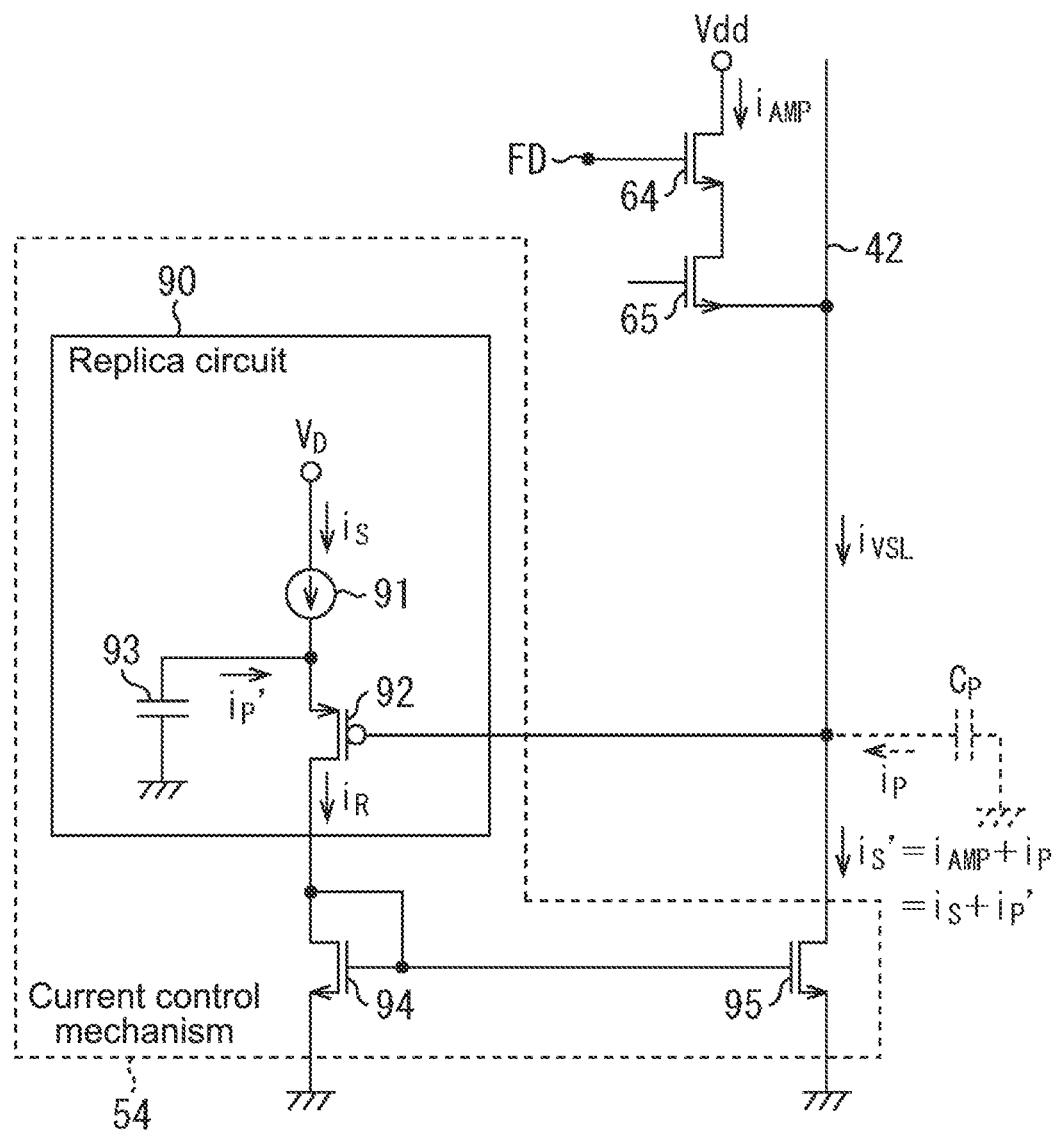
FIG. 7 is a circuit diagram showing a first exemplary configuration of a current control mechanism.

FIG. 7 is a circuit diagram showing a first exemplary configuration of the current control mechanism 54 of FIG. 4. It should be noted that Japanese Patent Application Laid-open No. 2011-234243 discloses the first exemplary configuration of FIG. 7.

In FIG. 7, the current control mechanism 54 includes a replica circuit 90 and FETs 94 and 95.

The replica circuit 90 functions as a replica of the VSL 42 and replicates the amplifier current $i_{AMP}$.

The replica circuit 90 is mounted using a pMOS (positive channel MOS) FET 92, which is a FET having the opposite polarity of the nMOS serving as the amplifier Tr 64 in which the amplifier current $i_{AMP}$ flows.

The replica circuit 90 includes a current source 91, the FET 92, and a capacitor 93.

The current source 91 is connected to a predetermined power supply $V_D$ at one end and connected to a source of the FET 92 at the other end. The same current as the current $i_S$ (FIG. 6) provided by the current source 53 is provided in a direction in which a current is drawn from the power supply $V_D$.

It should be noted that the power supply $V_D$ may be the same power supply as the power supply Vdd or may be a different power supply.

The FET 92 forms a source follower together with the current source 91.

A gate of the FET 92 is connected to the VSL 42, and the source of the FET 92 is connected to the current source 91 and also to the capacitor 93, which is a load of the source follower.

The capacitor 93 is a capacitor corresponding to the parasitic capacitance $C_P$ and is grounded at one end and connected to the source of the FET 92 at the other end as described above.

The FETs 94 and 95 are each an nMOS FET and form a current mirror.

In other words, a gate of the FET 94 and a gate of the FET 95 are connected to each other and a connection point between those gates is connected to a drain of the FET 94. Sources of the FETs 94 and 95 are grounded. The drain of the FET 94 is connected to a drain of the FET 92 of the replica circuit 90, and a drain of the FET 95 is connected to the VSL 42.

Assuming that a mirror ratio of the current mirror formed of the FETs 94 and 95, i.e., a ratio of channel widths of the FETs 94 and 95 (the channel length is assumed to be the same) is represented by 1:M, a current that is (almost) M times as large as the current flowing in the FET 94 flows in the FET 95.

It should be noted that in the current control mechanism 54 of FIG. 7, the FET 95 also serves as the current source 53 (FIG. 6). Assuming that the current flowing in the FET 95 (drain current) is $i_S'$, in FIG. 7, the load MOS current $i_{MOS}$ is equal to a current $i_S'$ flowing in the FET 95.

In the case where the VSL voltage is constant in the current control mechanism 54 formed as described above, the drain voltage of the pMOS FET 92 is also constant and a current $i_P'$ flowing in from the capacitor 93 becomes zero. So, a drain current $i_R$ of the FET 92 becomes equal to the current $i_S$ provided by the current source 91, and such a current $i_R=i_S$ flows in the FET 94.

Assuming that the mirror ratio of the current mirror formed of the FETs 94 and 95 is 1:1, the current $i_S'$ flowing in the FET 95 becomes equal to the current $i_R=i_S$ flowing in the FET 94, and the load MOS current $i_{MOS}$ that is equal to the current $i_S'$ flowing in the FET 95 becomes equal to the current $i_S$ provided by the current source 91.

So, when the current $i_S$ provided by the current source 91 is made equal to the current $i_S$ provided by the current source 53, the load MOS current $i_{MOS}$ becomes equal to a current in the case where the current control mechanism 54 is not provided and the current source 53 is connected.

In the case where the VSL voltage is a predetermined constant voltage, as described above, the load MOS current $i_{MOS}$ becomes equal to the current $i_S$ provided by the current source 91, that is, $i_P=0$. Further, although the load MOS current $i_{MOS}$ is the sum of the amplifier current $i_{AMP}$ and the current $i_P$ flowing in from the parasitic capacitance $C_P$, since $i_P=0$, the amplifier current $i_{AMP}$ becomes equal to the current $i_S$ provided by the current source 91.

When the electric signals are read out from the pixel units 41 to the VSL 42 and thus the VSL voltage decreases, in accordance with a change rate of that VSL voltage, a drain voltage of the pMOS FET 92 whose gate is connected to the VSL 42 changes and the current $i_P'$ flowing in the FET 92 from the capacitor 93 increases. Thus, the current (drain current) $i_R$ flowing in the FET 92 increases. In other words, the current $i_R$ flowing in the FET 92 is the sum of the current $i_S$ provided by the current source 91 and the current $i_P'$ flowing in from the capacitor 93, i.e., $i_S+i_P'$. So, in the case where the current $i_P'$ flowing in from the capacitor 93 to the FET 92 increases, the current $i_R$ flowing in the FET 92 increases.

As described above, assuming that the mirror ratio of the current mirror formed of the FETs 94 and 95 is 1:1, the current $i_S'$ flowing in the FET 95 becomes equal to the current $i_R=i_S+i_P'$ flowing in the FET 94, and the load MOS current $i_{MOS}$ equal to the current $i_S'$ flowing in the FET 95 becomes the sum of the current $i_S$ provided by the current source 91 and the current $i_P'$ flowing in from the capacitor 93, i.e., $i_S+i_P'$.

Further, since the load MOS current $i_{MOS}$ is also the sum of the amplifier current $i_{AMP}$ and the current $i_P$ flowing in from the parasitic capacitance $C_P$, i.e., $i_{AMP}+i_P$, the following expression is established.

$$i_{MOS}=i_S+i_P'=i_{AMP}+i_P$$

So, when the capacitance (electrostatic capacitance) of the capacitor 93 is made equal to the parasitic capacitance $C_P$ and thus the current $i_P'$ flowing in from the capacitor 93 and the current $i_P$ flowing in from the parasitic capacitance $C_P$ are made equal to each other ($i_P'=i_P$), the above expression $i_{MOS}=i_S+i_P'=i_{AMP}+i_P'$ is changed to an expression $i_S=i_{AMP}$, and the amplifier current $i_{AMP}$ and the current $i_S$ provided by the current source 91 become equal to each other.

As described above, in the current control mechanism 54 of FIG. 7, the wiring used for detecting the amplifier current $i_{AMP}$ and connected to the drain of the amplifier Tr 64 is not additionally provided. Information of the amplifier current $i_{AMP}$ (timing at which the amplifier current $i_{AMP}$ changes (further, timing at which the load MOS current $i_{MOS}$ is to be dynamically controlled)) is obtained in the replica circuit 90 at hand due to (the decrease of) the VSL voltage. Then, the current $i_P'$ of the capacitor 93, which is equal to the current $i_P$ of the parasitic capacitance $C_P$, is provided as the load MOS current $i_{MOS}$ in the current mirror formed of the FETs 94 and 95. Thus, the load MOS current $i_{MOS}$ is increased by the current $i_P'=i_P$.

As a result, according to the current control mechanism 54 of FIG. 7, when the electric signals are read out from the pixel units 41 to the VSL 42 and thus the VSL voltage decreases, the load MOS current $i_{MOS}$ is increased. This can shorten a VSL settling time in which the decreasing VSL voltage is settled.

Here, the current control mechanism 54 of FIG. 7 has characteristics such as having a small loop delay and good stability.

In actuality, however, there are non-ideal factors such as a circuit delay and the like. So, for example, circuit parameters of the current control mechanism 54, such as a capacitance of the capacitor 93 and the size of the FETs 94 and 95 forming the current mirror, are to be adjusted.

For example, in the current control mechanism 54, a delay occurs from when the VSL voltage is applied to the gate of the FET 92 to when the load MOS current $i_{MOS}=i_S'$ corresponding to that VSL voltage flows in the FET 95, and due to such a delay, undershoot is caused in the VSL voltage. When the capacitance of the capacitor 93 is made equal to the large parasitic capacitance $C_P$, the undershoot caused in the VSL voltage increases. This hinders the shortening of the VSL settling time.

For that reason, it is desirable for the capacitor 93 to adopt a capacitor having a smaller capacitance in some degree than the parasitic capacitance $C_P$ so as not to cause large undershoot in the VSL voltage.

Incidentally, in the current control mechanism 54 of FIG. 7, even in the case where a capacitor having a smaller capacitance in some degree than the parasitic capacitance $C_P$ is adopted as the capacitor 93, since the parasitic capacitance $C_P$ of the VSL 42 is large, and thus the capacitance of the capacitor 93 also becomes large.

Since the capacitor 93 having a large capacitance has a large mounting area, the current control mechanism 54 having such a capacitor 93 also has a large mounting area, and the mounting area of the image sensor 2 increases.

In this regard, there is a method of increasing the mirror ratio 1:M (M>1) of the current mirror formed of the FETs 94 and 95 and downsizing the capacitor 93 by reducing the capacitance of the capacitor 93 to 1/M of the parasitic capacitance $C_P$.

When the mirror ratio (M of 1:M) is increased too much, however, a response of the current mirror is deteriorated and a large delay is caused. So, for practical purposes, a ratio several times larger is a limit as the mirror ratio M. With a mirror ratio several times larger, the capacitance of the capacitor 93 can be reduced to a fraction of several times as large as the parasitic capacitance $C_P$, but the capacitance of the capacitor 93 is still large and the mounting area is also large.

Further, in the current control mechanism 54 of FIG. 7, the FET 92 of the source follower of the replica circuit 90 operates with the power supply $V_D$ as a reference, that is, the current source 91 connected to the FET 92 of the source follower is (directly) connected to the power supply $V_D$. So, there is a possibility that a power supply variation of the power supply $V_D$ (voltage variation of power supply $V_D$) appears in an image output by the image sensor 2.

Furthermore, in the current control mechanism 54 of FIG. 7, the gate of the FET 92 of the source follower of the replica circuit 90 is connected to the VSL 42. So, for the design of an operating point of the current source 91 that forms the source follower, the VSL voltage has to be taken into consideration, which is burdensome.

General Outline of Second Exemplary Configuration of Current Control Mechanism 54

Figure 8:
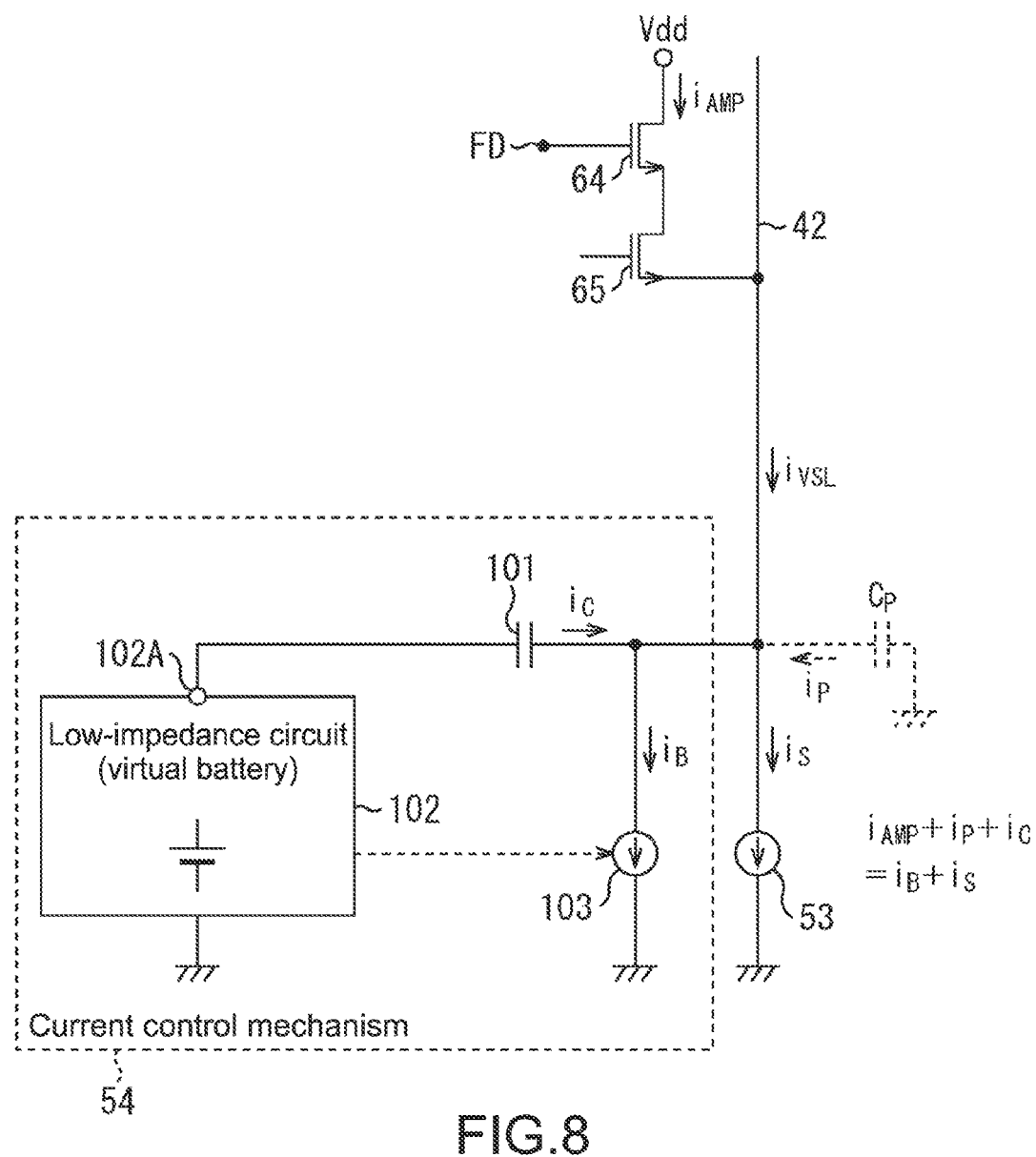
FIG. 8 is a circuit diagram showing a general outline of a second exemplary configuration of the current control mechanism.

FIG. 8 is a circuit diagram showing the general outline of a second exemplary configuration of the current control mechanism 54 of FIG. 4.

In FIG. 8, the current control mechanism 54 includes a capacitor 101, a low-impedance circuit 102, and a current source 103.

The capacitor 101 is connected to the VSL 42 at one end and connected to a terminal 102A of the low-impedance circuit 102 at the other end.

The low-impedance circuit 102 is a virtual battery, for example, and is a circuit seen as low impedance for the capacitor 101, when seen from the terminal 102A.

The low-impedance circuit 102 detects a current $i_C$ flowing in the capacitor 101 and controls the current source 103. The current source 103 is connected to (a connection point between the capacitor 101 and) the VSL 42 and provides a current $i_B$ to the VSL 42 according to the control of the low-impedance circuit 102, the current $i_B$ being substantially proportional to the current $i_C$ flowing in the capacitor 101.

Here, the current $i_B$ provided by the current source 103 is a current to increase (boost) the load MOS current $i_{MOS}$, and thus is hereinafter also referred to as boost current $i_B$. The current source 103 can be a boost current source that provides the boost current $i_B$.

In the current control mechanism 54 formed as described above, in the case where the VSL voltage is constant, that is, in the case where the VSL voltage is a (almost) constant voltage, the current $i_C$ flowing in the capacitor 101 is zero, and the current source 103 provides the boost current $i_B=f(i_C)=f(0)$, which corresponds to the zero current $i_C$.

Here, f( ) represents a monotonically increasing function, and f(0) is assumed as a value of 0 or more. For example, as f( ), f(i)=ai+b (a>1, b>=0) can be adopted. For example, when f(0)=0 and when the VSL voltage is constant, $i_C=i_B=0$. So, the amplifier current $i_{AMP}=i_S-i_P-i_C$ and the current $i_S$ provided by the current source 53 are represented as $i_{AMP}=i_S$.

When the electric signals are read out from the pixel units 41 to the VSL 42 and thus the VSL voltage decreases (changes), the current $i_C$ that corresponds to a change rate of the VSL voltage and is not zero flows in the capacitor 101.

In other words, the other end of the capacitor 101, which is not connected to the VSL 42, is connected to (the terminal 102A of) the low-impedance circuit 102. Even when the VSL voltage varies, the voltage (potential) of the other end of the capacitor 101, which is not connected to the VSL 42, does not almost vary.

Thus, the current $i_C$ that corresponds to a change rate of the VSL voltage and is not zero flows in the capacitor 101. So, it can be said that the capacitor 101 coverts the change rate of the VSL voltage into the current $i_C$ for detection.

When the current $i_C$ that corresponds to the change rate of the VSL voltage flows in the capacitor 101, the low-impedance circuit 102 detects the current $i_C$ and controls the current source 103. With this operation, the current source 103 provides the boost current $i_B=f(i_C)$ corresponding to the current $i_C$ of the capacitor 101.

The boost current $i_B=f(i_C)$ is larger than the boost current $i_B=f(0)$ when $i_C=0$. So, when the current source 103 provides the boost current $i_B=f(i_C)$, the load MOS current $i_{MOS}=i_S+i_B$ increases.

Here, in FIG. 8, the load MOS current $i_{MOS}$ is the sum of the current $i_S$ provided by the current source 53 and the boost current $i_B$ provided by the current source 103, i.e., $i_{MOS}=i_S+i_B$.

Further, the load MOS current $i_{MOS}$ is also the sum of the amplifier current $i_{AMP}$, the current $i_P$ flowing in from the parasitic capacitance $C_P$, and the current $i_C$ flowing in the capacitor 101, i.e., $i_{MOS}=i_{AMP}+i_P+i_C$.

So, the following expression is established.

$$i_S+i_B=i_{AMP}+i_P+i_C \ (=i_{MOS})$$

When the boost current $i_B$ is considered as a current corresponding to the current $i_C$ flowing in the capacitor 101, which is expressed by $i_B=f(i_C)=i_C+i_P$, the expression $i_S+i_B=i_{AMP}+i_P+i_C$ can be deformed to be $i_{AMP}=i_S$, and thus $i_{AMP}$ can be set to be a constant current.

As described above, in the current control mechanism 54 of FIG. 8, the capacitor 101 converts the change (decrease) of the VSL voltage into the current $i_C$ corresponding to the change rate, and the current source 103 provides the boost current $i_B=f(i_C)$ corresponding to the current $i_C$. Thus, the load MOS current $i_{MOS}$ is increased.

As a result, according to the current control mechanism 54 of FIG. 8, when the electric signals are read out from the pixel units 41 to the VSL 42 and thus the VSL voltage decreases, the load MOS current $i_{MOS}$ is increased. This can shorten the VSL settling time.

Figure 9:
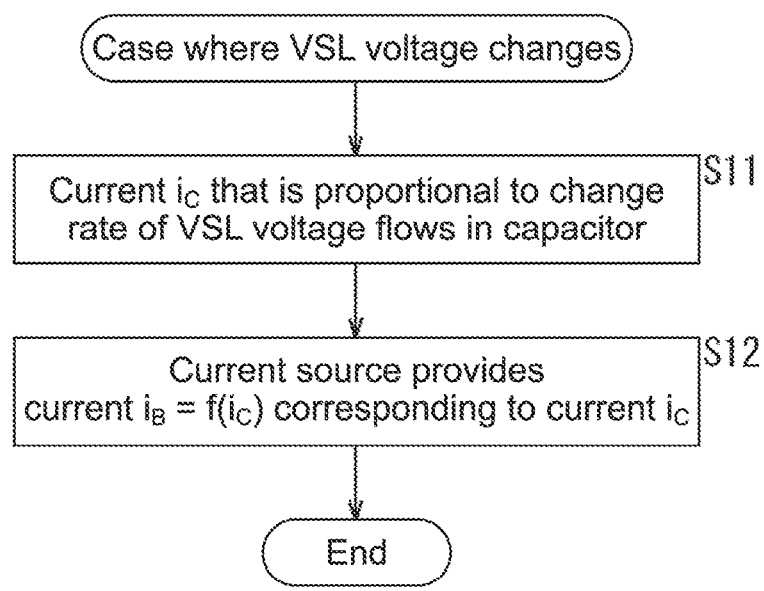
FIG. 9 is a flowchart for describing an operation of the current control mechanism when a VSL voltage changes.

FIG. 9 is a flowchart for describing an operation of the current control mechanism 54 of FIG. 8 when the VSL voltage changes.

When the VSL voltage changes, in Step S11, the current $i_C$ corresponding to the change rate of the VSL voltage, that is, the current $i_C$ that is proportional to a differential of the VSL voltage flows in the capacitor 101.

In Step S12, the current source 103 provides the boost current $i_B=f(i_C)$ corresponding to the current $i_C$ to the VSL 42 and thus the load MOS current $i_{MOS}=i_S+i_B$ is increased.

As described above, the load MOS current $i_{MOS}$ is increased, and consequently the VSL settling time can be shortened.

Details of Second Exemplary Configuration of Current Control Mechanism 54

Figure 10:
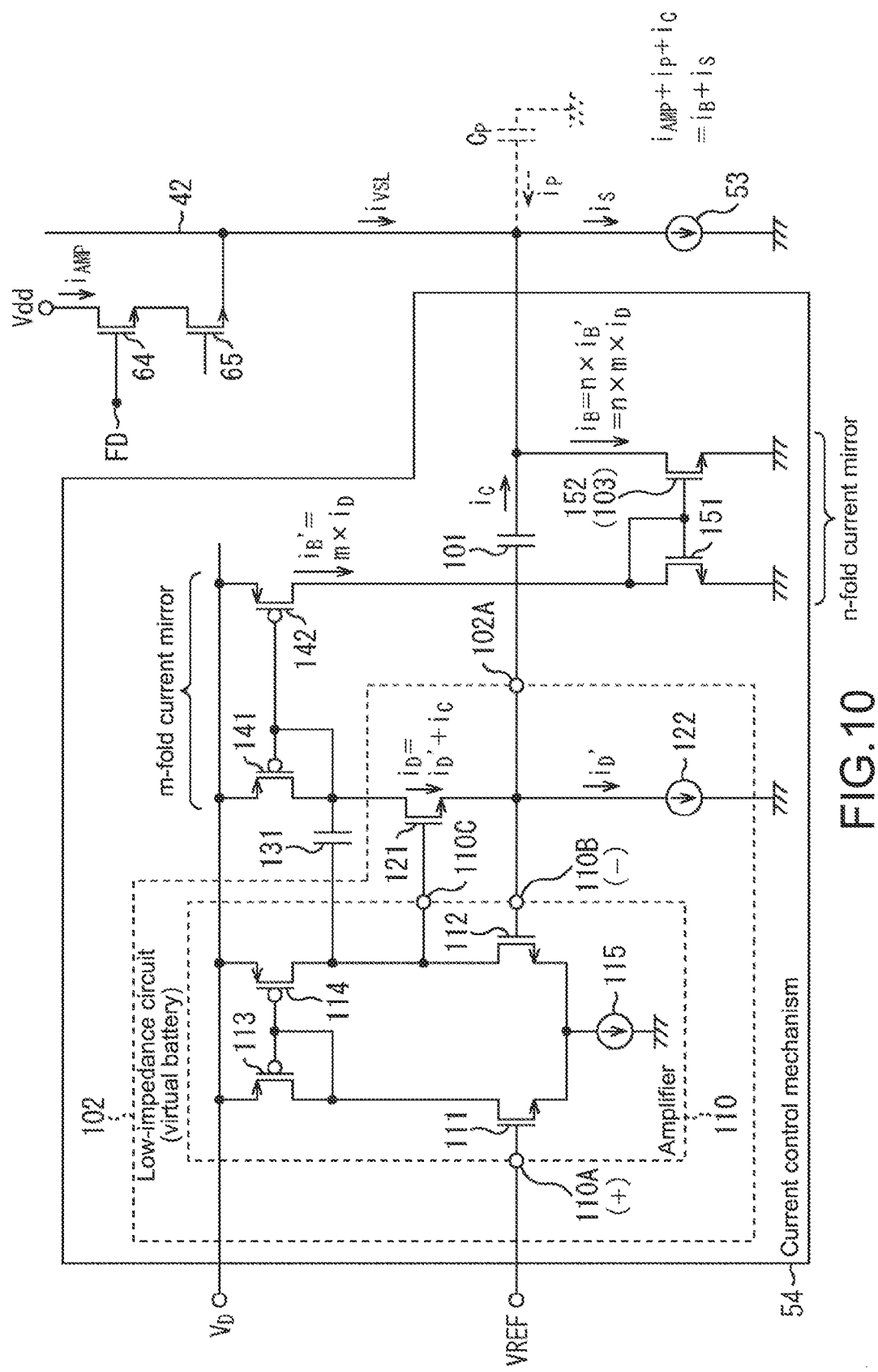
FIG. 10 is a circuit diagram showing the details of the second exemplary configuration of the current control mechanism.

FIG. 10 is a circuit diagram showing the details of the second exemplary configuration of the current control mechanism 54 of FIG. 4.

It should be noted that in FIG. 10, components corresponding to those of FIG. 8 are denoted by the same reference symbols and hereinafter description thereof will be appropriately omitted.

In FIG. 10, the current control mechanism 54 includes a capacitor 101, an amplifier 110, a FET 121, a current source 122, a capacitor 131, FETs 141 and 142, and FETs 151 and 152.

The amplifier 110 is formed of a differential pair and includes FETs 111, 112, 113, and 114 and a current source 115.

The FETs 111 and 112 are each an nMOS FET and form a differential pair.

In other words, sources of the FETs 111 and 112 are connected to each other and a connection point of those sources is connected to one end of the current source 115 having the other end grounded.

A gate of the FET 111 is connected to a non-inverting input terminal 110A of the amplifier 110, and a gate of the FET 112 is connected to an inverting input terminal 110B of the amplifier 110.

A drain of the FET 111 is connected to a drain of the FET 113, and a drain of the FET 112 is connected to a drain of the FET 114 and to an output terminal 110C of the amplifier 110.

The FETs 113 and 114, which are each a pMOS FET, form a current mirror and are connected to the differential pair formed of the FETs 111 and 112, as a load of the differential pair.

In other words, gates of the FETs 113 and 114 are connected to each other and a connection point of those gates are connected to the drain of the FET 113.

Sources of the FETs 113 and 114 are each connected to a power supply $V_D$.

The current source 115 provides a constant current such that the sum of the drain currents of the FETs 111 and 112, which form the differential pair, becomes constant.

A gate of the FET 121 is connected to the output terminal 110C of the amplifier 110, and a source of the FET 121 is connected to the inverting input terminal 110B of the amplifier 110.

The source of the FET 121 is also connected to one end of a current source (current source for source follower) 122 having the other end grounded. So, the FET 121 is a source follower.

A drain of the FET 121 is connected to a drain of the FET 141.

The amplifier 110, the FET 121 of the source follower, and the current source 122 described above form a virtual battery as the low-impedance circuit 102 of FIG. 8.

The terminal 102A of the low-impedance circuit 102 is connected to a connection point between the output terminal of the amplifier 110 and the source of the FET 121 of the source follower, and also to the capacitor 101 as described with reference to FIG. 8.

Here, in this embodiment, the amplifier 110 has a role of only determining a voltage (potential) (DC (Direct Current) operating point) of the terminal 102A of the low-impedance circuit 102, which is connected to the capacitor 101. High frequency characteristics are not so much requested for the amplifier 110.

As described above, since a gain of the amplifier 110 is not so much requested, it is not necessary to provide a large current to the FETs 111 and 112 that form the differential pair. A current provided by the current source 115 can be limited to a small current. So, the consumption current of the amplifier 110 can be reduced.

Further, a predetermined reference voltage (potential) VREF is applied to the non-inverting input terminal 110A of the amplifier 110.

Here, the reference voltage VREF applied to the non-inverting input terminal 110A of the amplifier 110 can be generated by a voltage source having an appropriate drive capability on the outside of the current control mechanism 54 and can be supplied to the current control mechanism 54 of each column of the pixel units 41.

As the voltage source that generates the reference voltage VREF (hereinafter, also referred to as reference voltage source), for example, a circuit using an operational amplifier to generate a reference voltage VREF with a high drive capability can be adopted.

However, the reference voltage VREF can be generated without using the operational amplifier.

In other words, as the reference voltage source, for example, two resistors connected in series are adopted to divide a predetermined (direct-current) voltage by the two resistors, and thus the reference voltage VREF can be generated.

Further, as a reference current source, for example, two resistors connected in series and an nMOS FET of a source follower whose gate is connected to a connection point between those two resistors are adopted, and a voltage of a source of the FET in that source follower can be output as a reference voltage VREF.

The amplifier 110 to which the reference voltage VREF is applied is galvanically separated from the VSL 42 by the capacitor 101. So, a value appropriate for an operation of the current control mechanism 54 can be set for the reference voltage VREF independently of the VSL voltage.

In FIG. 10, in the amplifier 110 in which the reference voltage VREF is applied to the non-inverting input terminal 110A, the voltage of the output terminal 110C is adjusted such that the voltage of the inverting input terminal 110B becomes equal to the reference voltage VREF, which is applied to the non-inverting input terminal 110A.

As a result, the voltage of the terminal 102A of the low-impedance circuit 102, the terminal 102A being connected to the inverting input terminal 110B, and the voltage of the other end of the capacitor 101, the other end being connected to the terminal 102A, become (almost) the reference voltage VREF.

It should be noted that the terminal 102A of the low-impedance circuit 102 is connected to the source of the FET 121 of the source follower, and thus the impedance of the low-impedance circuit 102 when seen from the terminal 102A has a value obtained by dividing output impedance of the FET 121 of the source follower by a gain of the amplifier 110. Thus, a value of low impedance is obtained.

Further, in FIG. 10, as described above, the current source 122 is connected to the source of the FET 121, and the capacitor 101 is also connected to the source of the FET 121 (via terminal 102A). So, a (drain) current $i_D$ that flows in the FET 121 of the source follower of FIG. 10 is equal to the sum of the current $i_D'$ provided by the current source 122 and the current $i_C$ flowing in the capacitor 101, i.e., $i_D=i_D'+i_C$.

So, the change rate of the VSL voltage can be converted into the current $i_C$ flowing in the capacitor 101 and subsequently detected as the (drain) current $i_D=i_D'+i_C$ flowing in the FET 121.

The capacitor 131 is connected to the drain of the FET 121 at one end and connected to the drain of the FET 114 at the other end. The capacitor 131 is a capacitor for waveform shaping at the rise of the VSL voltage and may not be provided.

The FETs 141 and 142 are each a pMOS FET and form a current mirror (first current mirror) having a mirror ratio of 1:m (m>1), in which the FET 141 is a mirror source and the FET 142 is a mirror destination.

In other words, gates of the FETs 141 and 142 are connected to each other and a connection point of those gates is connected to the drain of the FET 141.

Sources of the FETs 141 and 142 are both connected to the power supply $V_D$.

The drain of the FET 141 is connected to the drain of the FET 121 of the source follower, and a drain of the FET 142 is connected to a drain of the FET 151.

Here, the current mirror having the mirror ratio of 1:m and formed of the FETs 141 and 142 is hereinafter referred to as m-fold current mirror.

The FETs 151 and 152 are each an nMOS FET and form a current mirror (second current mirror) having a mirror ratio of 1:n (n>1), in which the FET 151 is a mirror source and the FET 152 is a mirror destination.

In other words, gates of the FETs 151 and 152 are connected to each other and a connection point of those gates is connected to the drain of the FET 151.

Sources of the FETs 151 and 152 are both grounded.

The drain of the FET 151 is connected to the drain of the FET 142 as described above, and a drain of the FET 152 is connected to one end of the capacitor 101, that is, to the VSL 42.

Here, the current mirror having the mirror ratio of 1:n and formed of the FETs 151 and 152 is hereinafter referred to as n-fold current mirror.

The FET 152 as a mirror destination of the n-fold current mirror corresponds to the current source 103 of FIG. 8.

Figure 11:
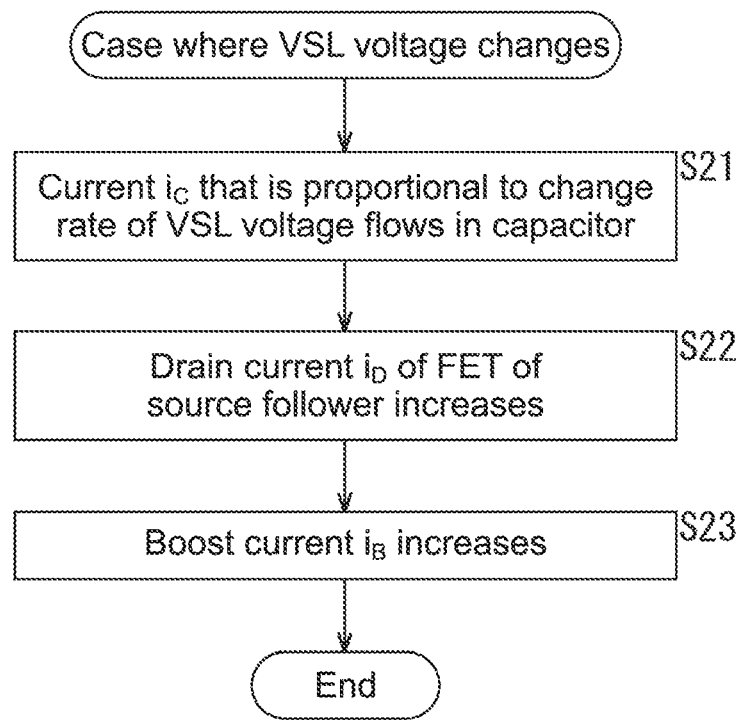
FIG. 11 is a flowchart for describing an operation of the current control mechanism when the VSL voltage changes.

FIG. 11 is a flowchart for describing an operation of the current control mechanism 54 of FIG. 10 when the VSL voltage changes.

When the VSL voltage changes, in Step S21, the current $i_C$ corresponding to the change rate of the VSL voltage, which is proportional to a differential of the VSL voltage, flows in the capacitor 101.

When the current $i_C$ flows in the capacitor 101, in Step S22, the (drain) current $i_D=i_D'+i_C$ flowing in the FET 121 of the source follower increases by the current $i_C$ flowing in the capacitor 101.

In Step S23, the current $i_D$ flowing in the FET 121 is multiplied by m times in the m-fold current mirror formed of the FETs 141 and 142. As a result, a current $i_B'=m*i_D$, which is m times as large as the current $i_D$ flowing in the FET 121, flows in the FET 142.

Further, in Step S23, the current $i_B'=m*i_D$ flowing in the FET 142 is multiplied by n times in the n-fold current mirror formed of the FETs 151 and 152. As a result, a boost current $i_B=n*i_B'=n*m*i_D$, which is n times as large as the current $i_B'=m*i_D$ flowing in the FET 142, flows in the FET 152.

In the FET 152 of the n-fold current mirror, the boost current $i_B$ is extracted by the VSL 42, and thus the extracted boost current $i_B$ flows in the VSL 42 (i.e., the boost current $i_B$ flows while being included in the load MOS current $i_{MOS}=i_B+i_S$).

Assuming that the current $i_C$ of the capacitor 101 changes (increases) from zero to $i_C$ (>0) due to the change of the VSL voltage, the current $i_D=i_D'+i_C$ flowing in the FET 121 increases by the current $i_C$. Thus, the boost current $i_B=n*m*i_D$ increases by $n*m*i_C$, and the load MOS current $i_{MOS}=i_B+i_S$ also increases by $n*m*i_C$. Consequently, the VSL settling time can be shortened.

Here, assuming that the current control mechanism 54 does not cause any delay, if the increase amount of the load MOS current $i_{MOS}=i_B+i_S$, that is, the increase amount $n*m*i_C$ of the boost current $i_B$ is equal to the sum of the current $i_C$ flowing in the capacitor 101 and the current $i_P$ flowing in from the parasitic capacitance $C_P$, i.e., $i_C+i_P$, the increase amount $n*m*i_C$ of the boost current $i_B$ cancels out (compensates for) the current $i_C$ flowing in the capacitor 101 and the current $i_P$ flowing in from the parasitic capacitance $C_P$.

Further, since the current control mechanism 54 includes the two current mirrors, that is, the m-fold current mirror and the n-fold current mirror, conversion of a current from a direction in which a current is provided to the load MOS current $i_{MOS}$ to a direction in which a current is extracted from the load MOS current $i_{MOS}$ can be performed in addition to the n-times multiplication of the current in the n-fold current mirror.

Furthermore, since the current control mechanism 54 includes the two current mirrors, that is, the m-fold current mirror and the n-fold current mirror, the mirror ratios of the current mirrors (i.e., the mirror ratio 1:m of the m-fold current mirror and the mirror ratio 1:n of the n-fold current mirror) can be made small. As a result, the response of the current mirror can be prevented from being deteriorated due to the increase of the mirror ratios.

Moreover, since the current control mechanism 54 includes the two current mirrors, that is, the m-fold current mirror and the n-fold current mirror, the current $i_C$ flowing in the capacitor 101 due to the decrease of the VSL voltage can be amplified by $m*n$ times by the m-fold current mirror and the n-fold current mirror, to obtain the boost current $i_B$, and the load MOS current $i_{MOS}=i_B+i_S$ can be increased by the boost current $i_B$.

As described above, since the current $i_C$ flowing in the capacitor 101 due to the decrease of the VSL voltage can be amplified by $m*n$ times by the m-fold current mirror and the n-fold current mirror, the capacitance of the capacitor 101, which defines the magnitude of the current $i_C$, can be made small.

It should be noted that the capacitance of the capacitor 101 is optimized by a standard to minimize time that is spent to settle a VSL voltage (VSL settling time) when the electric signals are read out from the pixel units 41 to the VSL 42 and thus the VSL voltage is decreased, for example.

In the current control mechanism 54, in the case where the boost current $i_B$ is provided to the VSL 42, undershoot is easily caused in the VSL voltage due to a delay caused in the current control mechanism 54, and the like. According to the standard to minimize the VSL settling time, an optimum value of the capacitance of the capacitor 101 is rather smaller than a value $C_P/(n*m)$ obtained by dividing the parasitic capacitance $C_P$ by the mirror ratio 1:n*m of the two current mirrors of the m-fold current mirror and the n-fold current mirror.

Here, in the current control mechanism 54 of FIG. 10, the FET 121 of the source follower is an nMOS FET and its source is connected to one end of the capacitor 101 having the other end connected to the VSL 42. When the electric signals are read out from the pixel units 41 to the VSL 42 and thus the VSL voltage decreases (when the VSL voltage falls), the current $i_D$ flowing in the FET 121 increases by the current $i_C$ flowing in the capacitor 101 due to the decrease of the VSL voltage as compared to the case where the VSL voltage is constant.

As described above, the current $i_D$ flowing in the FET 121 is the sum of the current $i_D'$ provided by the current source 122 and the current $i_C$ flowing in the capacitor 101, i.e., $i_D'+i_C$. So, in the case where the VSL voltage is constant and $i_C=0$, the current $i_D$ flowing in the FET 121 is the smallest, $i_D=i_D'$.

Now assuming that the current $i_D'$ of the current source 122 is zero, in the case where the VSL voltage is constant and $i_C=0$, the current $i_D$ flowing in the FET 121 is zero. So, when the current $i_C$ flows in the capacitor 101 due to the decrease of the VSL voltage, the FET 121 switches from off to on and the current $i_D$ equal to the current $i_C$ flows. Subsequently, the FETs 141 and 142 of the m-fold current mirror and the FETs 151 and 152 of the n-fold current mirror are switched from off to on.

In other words, in the case where the current $i_D'$ of the current source 122 is zero, the decrease of the VSL voltage causes the FETs 121, 141, and 151 to be turned on after the current $i_C$ starts flowing in the capacitor 101. In the FETs 121, 141, and 151, however, a change in gate-source voltage corresponding to the turning-on is necessary, and a delay for charging for the change in gate-source voltage is caused.

Such a delay can be reduced if the current $i_D'$, which is not zero, flows in the current source 122. So, a large current $i_D'$ is desirable in terms of the reduction of delay.

On the other hand, the current $i_D'$ becomes the current $i_D$ flowing in the FET 121 and eventually flows as the boost current $i_B=n*m*i_D=n*m*i_D'$ via the m-fold current mirror and the n-fold current mirror. So, a smaller current is desirable in terms of the suppression of consumption current.

Further, since the m-fold current mirror and the n-fold current mirror become noise sources, the current $i_D'$ to be the boost current $i_B=n*m*i_D=n*m*i_D'$ obtained in the m-fold current mirror and the n-fold current mirror is desirably small also in terms of the reduction of noise.

As described above, the current $i_D'$ is desirably large in terms of the reduction of delay, but the current $i_D'$ is desirably small in terms of the suppression of consumption current and the reduction of noise. So, the current $i_D'$ of the current source 122 is determined based on a trade-off relationship of the reduction of delay, the suppression of consumption current, and the reduction of noise.

It should be noted that in the current control mechanism 54 of FIG. 10, the boost current $i_B$ is secondarily affected by a power supply variation of the power supply $V_D$ (voltage variation of power supply $V_D$), that is, the boost current $i_B$ is affected via the m-fold current mirror. So, as compared with the case of FIG. 7, it is possible to largely improve the PSRR (Power Supply Rejection Ratio).

Here, in the case where the current control mechanism 54 of FIG. 10 is provided to the image sensor 2, the FET 152 serving as the current source 103 (FIG. 8) of the current control mechanism 54 can be provided with a function of the current source 53, instead of providing the current source 53.

In FIG. 10, in the case where the VSL voltage is constant, the current $i_C$ flowing in the capacitor 101 is zero. Thus, the load MOS current $i_{MOS}$ is expressed as follows.

$$i_{MOS}=i_B+i_S=n*m*i_D+i_S=n*m*(i_D'+i_C)+i_S=n*m*i_D'+i_S$$

In the case where the current source 53 is not provided, the current $i_S$ becomes zero. The load MOS current $i_{MOS}$ when the VSL voltage is constant is equal to the boost current $i_B$ and is expressed as follows.

$$i_{MOS}=i_B=n*m*i_D'+i_S=n*m*i_D'$$

So, the load MOS current $i_{MOS}$ when the VSL voltage is constant is uniquely determined by the current $i_D'$ provided by the current source 122 and there are no other options.

However, to optimize the VSL settling time in relation to the consumption current for reading out the electric signals to be the pixel values from the pixel units 41, such as the consumption current of the current control mechanism 54, it is undesirable that there be no options of currents that should be independently determined under normal conditions, such as the load MOS current $i_{MOS}$ when the VSL voltage is constant and a current in each unit of the current control mechanism 54.

Further, as described above, since the current mirror becomes a noise source, the boost current $i_B=n*m*i_D=n*m*i_D'$ obtained in the m-fold current mirror and the n-fold current mirror includes noise of the current mirror as a noise source (hereinafter, referred to as current mirror noise).

So, in the case where the current source 53 is not provided, the load MOS current $i_{MOS}$ is largely affected by the current mirror noise.

In this regard, a current source with less noise is provided as the current source 53, and thus the influence of the current mirror noise on the load MOS current $i_{MOS}$ can be reduced.

In the case where the current source 53 is provided, the load MOS current $i_{MOS}$ when the VSL voltage is constant is expressed as described above, i.e., $i_{MOS}=n*m*i_D'+i_S$, but such a load MOS current $i_{MOS}$ is desirably not too large in terms of power consumption.

Details of Third Exemplary Configuration of Current Control Mechanism 54

Figure 12:
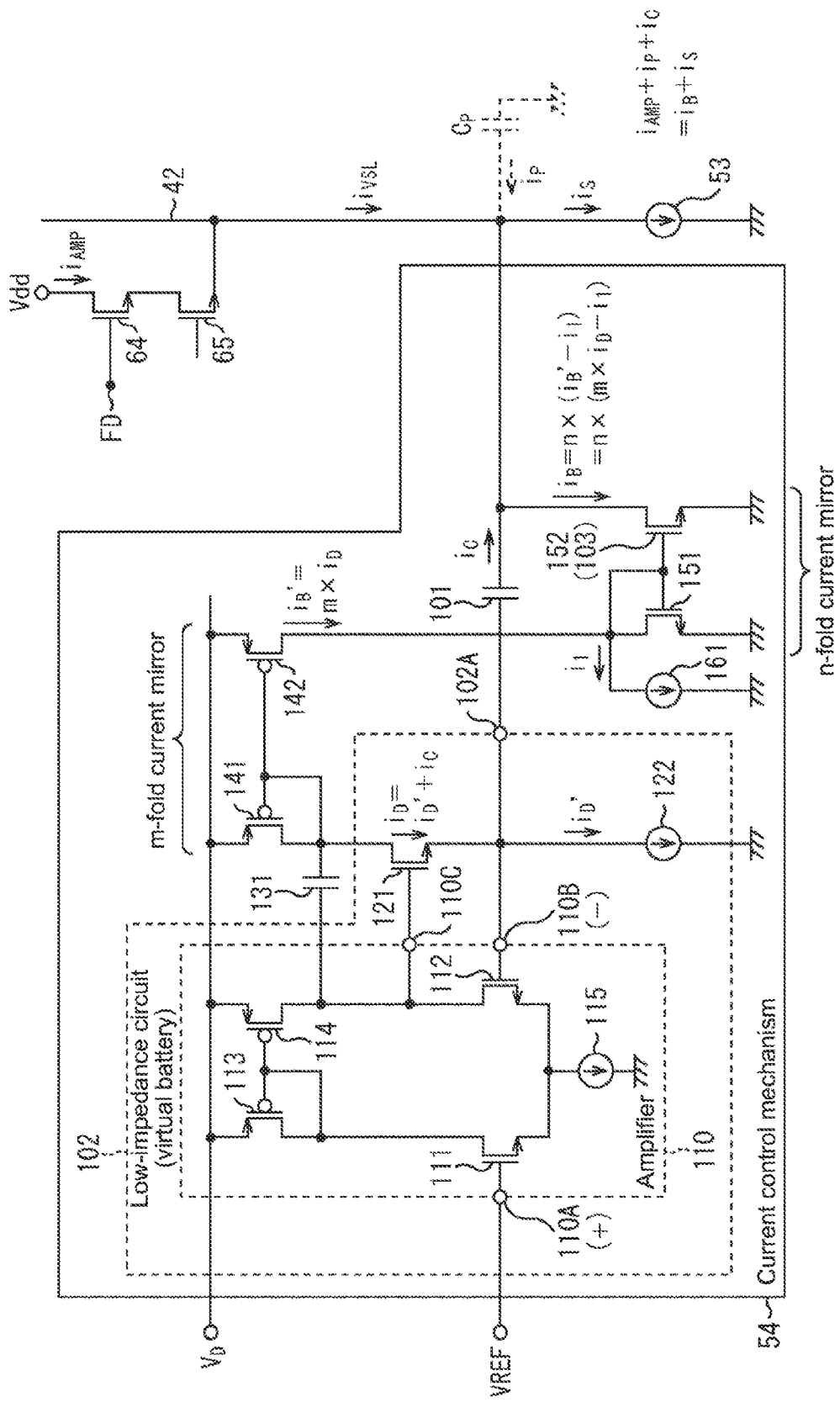
FIG. 12 is a circuit diagram showing the details of a third exemplary configuration of the current control mechanism.

FIG. 12 is a circuit diagram showing the details of a third exemplary configuration of the current control mechanism 54 of FIG. 4.

It should be noted that in FIG. 12, components corresponding to those of FIG. 10 are denoted by the same reference symbols and hereinafter description thereof will be appropriately omitted.

A current control mechanism 54 of FIG. 12 is the same as that of FIG. 10 in that the amplifier 110, the FET 121, the current source 122, the capacitor 131, the FETs 141 and 142, and the FETs 151 and 152 are provided.

However, the current control mechanism 54 of FIG. 12 is different from that of FIG. 10 in that a current source 161 is newly provided.

The current source 161 is an extraction current source for extracting a predetermined current $i_1$ from the current $i_B'=m*i_D$ of the FET 142 as a mirror destination of the m-fold current mirror. The current source 161 is grounded at one end and connected to the drain of the FET 142 as the mirror destination of the m-fold current mirror at the other end.

The current source 161 provides the current $i_1$ and extracts the current $i_1$ from the current $i_B'=m*i_D$ of the FET 142 as the mirror destination of the m-fold current mirror.

As a result, the current of the FET 151 as a mirror source of the n-fold current mirror subsequent to the m-fold current mirror becomes the current $i_B'-i_1=m*i_D-i_1$, which is obtained by extracting the current $i_1$ from the current $i_B'=m*i_D$.

In the case where the VSL voltage is constant, since the current $i_C$ flowing in the capacitor 101 is zero, the current $i_D=i_D'+i_C$ becomes equal to the current $i_D'$ provided by the current source 122.

So, the current of the FET 151 as the mirror source of the n-fold current mirror becomes the current $i_B'-i_1=m*i_D-i_1=m*i_D'-i_1$.

In the n-fold current mirror, the current $i_B'-i_1=m*i_D'-i_1$ of the FET 151 is multiplied by n times and flows as the boost current $i_B$ in the FET 152 as a mirror destination of the n-fold current mirror.

As a result, the boost current $i_B$ is expressed as follows.

$$i_B=n*(m*i_D'-i_1)$$

Since the load MOS current $i_{MOS}$ is the sum of the boost current $i_B$ and the current $i_S$ provided by the current source 53, the load MOS current $i_{MOS}$ when the VSL voltage is constant is expressed as follows.

$$i_{MOS}=i_B+i_S=n*(m*i_D'-i_1)+i_S$$

From the above, in FIG. 12, as compared with the case of FIG. 10, the boost current $i_B$ in the load MOS current $i_{MOS}$ when the VSL voltage is constant can be changed from $n*(m*i_D')$ to $n*(m*i_D'-i_1)$ and can be made small by $n*i_1$. As a result, noise resulting from the boost current $i_B$ in the load MOS current $i_{MOS}$ can be reduced.

Here, a current from which the current source 161 extracts the current $i_1$ is the current $i_B'=m*i_D'$, which is obtained by multiplying the current $i_D=i_D'$ of the FET 121 by m times in the m-fold current mirror, and is a large current in some degree. So, the accuracy of the current $i_1$ is not so much requested (as compared with the case where the current $i_1$ is extracted from the current $i_D=i_D'$ before multiplied by m times in the m-fold current mirror).

Further, the current $m*i_D'-i_1$, which is obtained after the current $i_1$ is extracted from the current $i_B'=m*i_D'$ of the FET 142 as the mirror destination of the m-fold current mirror in the previous stage, flows in the FET 151 as the mirror source of the n-fold current mirror. So, if the current $i_1$ is assumed as $(m-1)i_D'$, a current equivalent to the current $i_D'$ flowing in (at least) the FET 142 as the mirror source of the m-fold current mirror in the previous stage flows in the FET 151 as the mirror source of the n-fold current mirror, and the FET 151 is turned on. Consequently, the response of the n-fold current mirror can be prevented from being deteriorated due to the turned-off FET 151.

Further, in the case where the current $i_1$ is extracted by the current source 161, the load MOS current $i_{MOS}$ when the VSL voltage is constant is expressed as follows, as described above.

$$i_{MOS}=i_B+i_S=n*(m*i_D'-i_1)+i_S$$

Thus, when the current $i_S$ of the current source 53 or the current $i_1$ of the current source 161 is adjusted such that the load MOS current $i_{MOS}$ become dominant over the current $i_S$ of the current source 53, not over the boost current $i_B=n*(m*i_D'-i_1)$, the influence of the noise of the current control mechanism 54 on the load MOS current $i_{MOS}$, that is, the noise included in the boost current $i_B$ can be suppressed.

It should be noted that the current source 161 for extracting the current $i_1$ operates based on the ground voltage as a reference, that is, the current source 161 is (directly) connected to the ground. Thus, the current source 161 can be formed as a current source that provides a stable current with less noise such as a power supply variation. The same holds true for the current source 53 and the current sources 115 and 122, each of which operates based on the ground voltage as a reference.

Simulation

Figure 13:
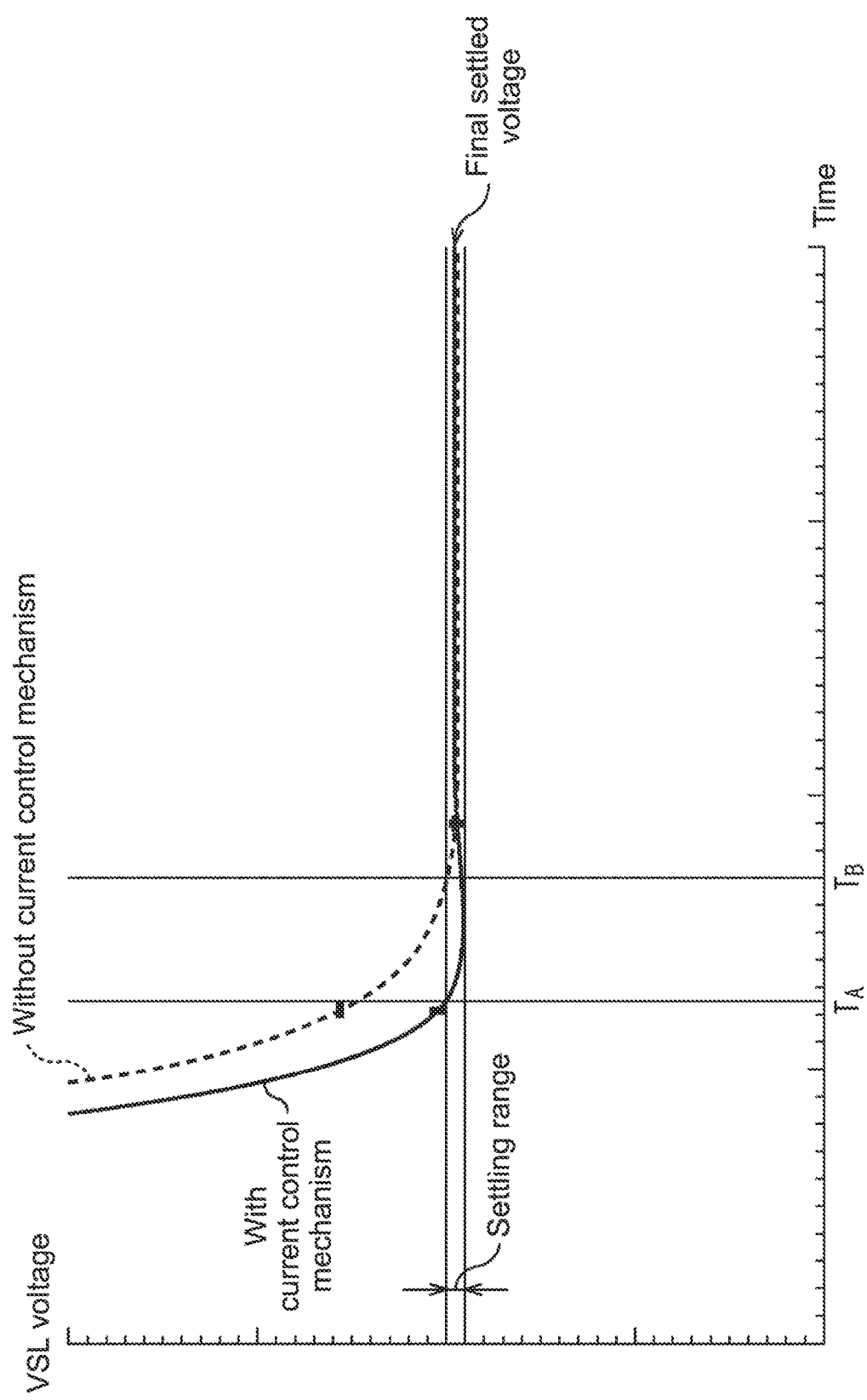
FIG. 13 is a diagram showing simulation results under simulation conditions in which a VSL settling time has priority.

FIG. 13 is a diagram showing simulation results of simulations where a VSL settling time is measured in the cases where the current control mechanism 54 of FIG. 10 or 12 is provided to the image sensor 2 and not provided to the image sensor 2.

In FIG. 13, the horizontal axis represents time and the vertical axis represents a VSL voltage.

Further, in FIG. 13, the solid line represents a VSL voltage in the case where the current control mechanism 54 of FIG. 10 or 12 is provided (hereinafter, also referred to as the case with the current control mechanism 54), and the dashed line represents a VSL voltage in the case where the current control mechanism 54 is not provided (hereinafter, also referred to as the case without the current control mechanism 54).

In a simulation where a VSL settling time is measured, in order to match a final voltage after the VSL voltage is settled (hereinafter, referred to as final settled voltage) in the case with the current control mechanism 54 to the final voltage in the case without the current control mechanism 54, the load MOS current $i_{MOS}=n*m*i_D'+i_S$ (or $n*(m*i_D'-i_1)+i_S$) after the VSL voltage is settled in the case with the current control mechanism 54 and the load MOS current $i_{MOS}=i_S$ after the VSL voltage is settled in the case without the current control mechanism 54 were matched to each other.

So, in the case with the current control mechanism 54, the consumption current becomes larger than the case without the current control mechanism 54 by an amount of the current consumed by components other than the FET 152 of the current control mechanism 54.

In the simulation, in a determination of the settlement of the VSL voltage, a minute range centering on the final settled voltage was set as a settling range for determining the settlement of the VSL voltage, and a starting point of a period in which the VSL voltage falls within the settling range was determined as a timing at which the VSL voltage is settled.

So, in the simulation, when the VSL voltage takes an upper limit value of the settling range, such a timing is determined as a timing at which the VSL voltage is settled.

In the case with the current control mechanism 54, in principle, undershoot occurs in the VSL voltage. So, the capacitance of the capacitor 101 was adjusted such that the bottom of the undershoot of the VSL voltage, i.e., a minimum value of the VSL voltage in which undershoot occurs, falls in the settling range.

In the case with the current control mechanism 54, the VSL voltage reaches the upper limit value of the settling range before a timing of the bottom of the undershoot of the VSL voltage. The timing at which the VSL voltage reaches the upper limit value of the settling range is determined as a timing at which the VSL voltage is settled.

In the simulations, it could be found that the VSL voltage is settled in the case with the current control mechanism 54 at a timing TA that is earlier than a timing (time) TB at which the VSL voltage is settled in the case without the current control mechanism 54.

In other words, in the simulations, the VSL settling time in the case with the current control mechanism 54 could be shortened about two out of ten of the VSL settling time in the case without the current control mechanism 54.

Figure 14:
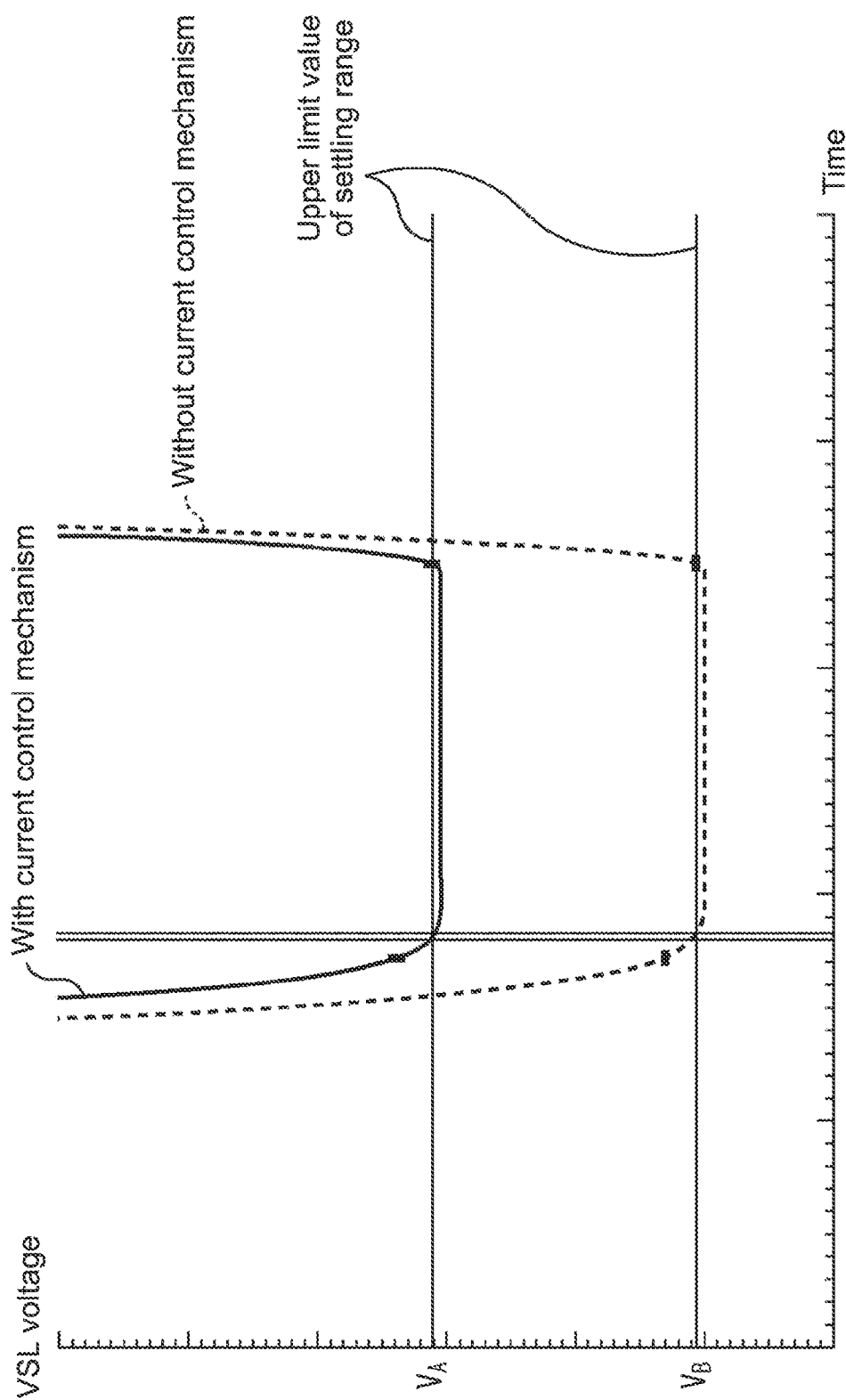
FIG. 14 is a diagram showing simulation results under simulation conditions in which a VSL voltage has priority.

FIG. 14 is a diagram showing simulation results of simulations where a VSL settling time is measured when the VSL settling times in the cases where the current control mechanism 54 is provided and not provided are (almost) matched to each other.

In FIG. 14, the horizontal axis represents time and the vertical axis represents the VSL voltage.

Further, in FIG. 14, the solid line represents a VSL voltage in the case with the current control mechanism 54, and the dashed line represents a VSL voltage in the case without the current control mechanism 54.

In a simulation where a VSL settling time is measured, in order to match a VSL settling time in the case with the current control mechanism 54 to a VSL settling time in the case without the current control mechanism 54, the load MOS current $i_{MOS}=n*m*i_D'+i_S$ (or $n*(m*i_D'-i_1)+i_S$) after the VSL voltage is settled in the case with the current control mechanism 54 and the load MOS current $i_{MOS}=i_S$ after the VSL voltage is settled in the case without the current control mechanism 54 were adjusted.

As a result of the adjustment of the load MOS current $i_{MOS}$, the consumption current in the case with the current control mechanism 54 could be reduced to about two out of ten of the consumption current in the case without the current control mechanism 54, even if a current flowing in components other than the FET 152 of the current control mechanism 54 is included.

So, if the VSL settling time requested for the image sensor 2 is identical, power consumption can be reduced more in the case with the current control mechanism 54 than in the case without the current control mechanism 54.

Further, in the simulations, it could be found that the VSL voltage is settled in the case with the current control mechanism 54 at a voltage $V_A$ higher than a voltage $V_B$ at which the VSL voltage is settled in the case without the current control mechanism 54.

So, in the case with the current control mechanism 54, it is possible to obtain a higher reset level and a wider dynamic range of the VSL voltage than in the case without the current control mechanism 54.

Details of Fourth Exemplary Configuration of Current Control Mechanism 54

Figure 15:
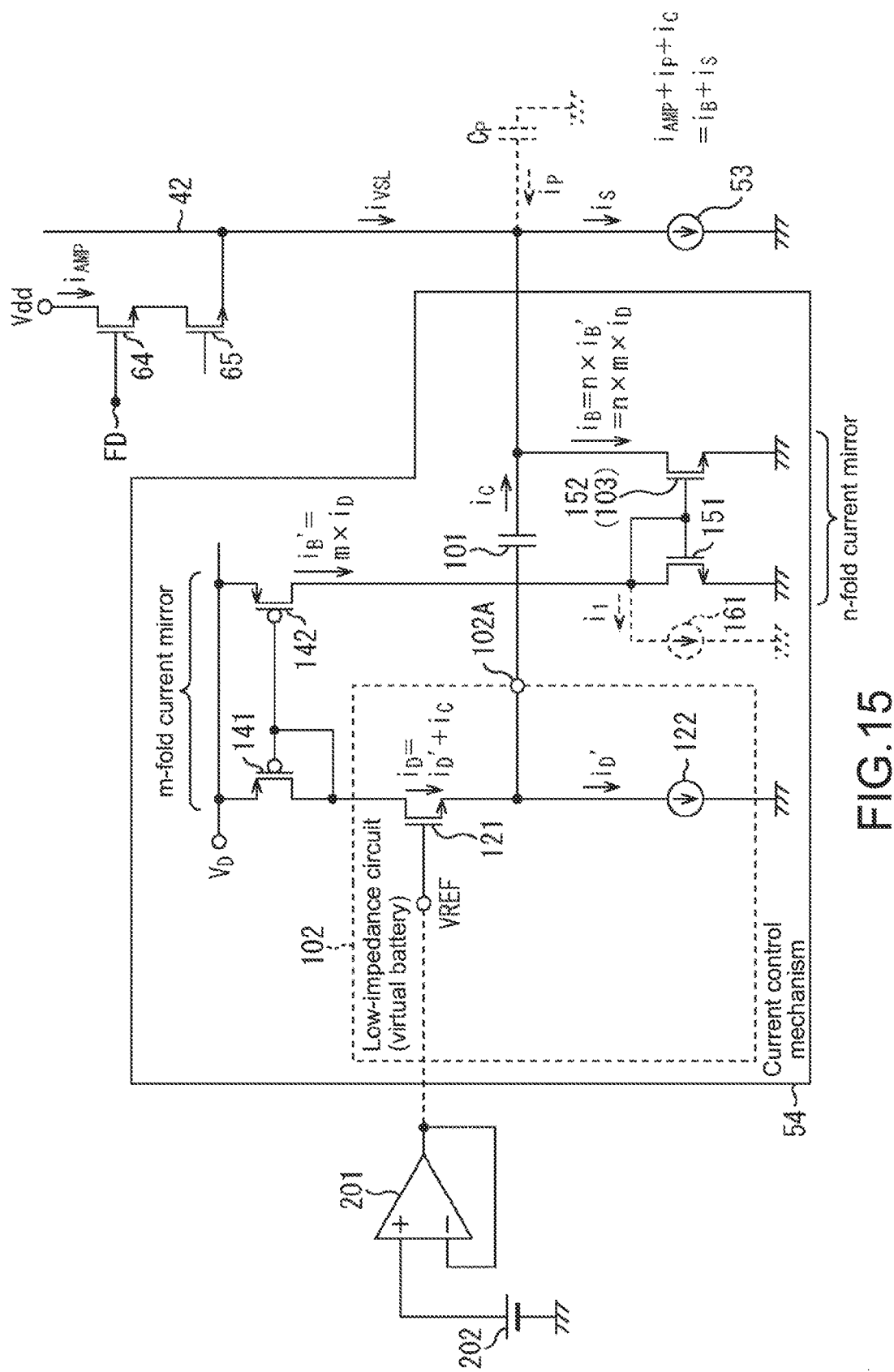
FIG. 15 is a circuit diagram showing the details of a fourth exemplary configuration of the current control mechanism.

FIG. 15 is a circuit diagram showing the details of a fourth exemplary configuration of the current control mechanism 54 of FIG. 4.

It should be noted that in FIG. 15, components corresponding to those of FIG. 10 or 12 are denoted by the same reference symbols and hereinafter description thereof will be appropriately omitted.

A current control mechanism 54 of FIG. 15 is the same as that of FIG. 10 in that the FET 121, the current source 122, the FETs 141 and 142, and the FETs 151 and 152 are provided.

However, the current control mechanism 54 of FIG. 15 is different from that of FIG. 10 in that the amplifier 110 and the capacitor 131 are not provided.

In FIG. 10, the current control mechanism 54 of each column of the pixel units 41 includes the amplifier 110, and by output of the amplifier 110 of the current control mechanism 54, the FET 121 of the source follower of the current control mechanism 54 is driven. In contrast to this, in FIG. 15, an amplifier 201 provided on the outside of the current control mechanism 54 is shared by the current control mechanisms 54 of the respective columns of the pixel units 41, and by output of the amplifier 201, the FETs 121 of the source followers of the current control mechanisms 54 in the respective columns are driven.

The current control mechanism 54 of FIG. 15 does not include the amplifier 110. So, the FET 121 and the current source 122 of the source follower form a low-impedance circuit 102.

Further, in FIG. 15, the amplifier 201 and a battery 202 that are shared by all the current control mechanisms 54 of the respective columns are provided on the outside of the current control mechanisms 54.

A non-inverting input terminal (+) of the amplifier 201 is connected to a plus terminal of the battery 202 whose minus terminal is grounded, and an inverting input terminal (−) of the amplifier 201 is connected to an output terminal of the amplifier 201. The output terminal of the amplifier 201 is connected to a gate of the FET 121 of the current control mechanism 54 (of each column).

The amplifier 201 outputs, as a reference voltage VREF, a voltage corresponding to a voltage of the battery 202 from the output terminal of the amplifier 201, the voltage of the battery 202 being input to the non-inverting input terminal (+) of the amplifier 201. Thus, the reference voltage VREF is applied to the gate of the FET 121.

In FIG. 10 (FIG. 12), the output of the amplifier 110 to which the reference voltage VREF is input is applied to the gate of the FET 121, while in FIG. 15, the reference voltage VREF output by the amplifier 201 to which the voltage of the battery 202 is input is applied to the gate of the FET 121 without passing through the amplifier 110.

As described above, in FIG. 15, since the reference voltage VREF is directly applied to the gate of the FET 121 without passing through the amplifier 110, the FET 121 is directly affected by the variation of the reference voltage VREF, as compared to the case of FIG. 10 where the reference voltage VREF is applied to the gate of the FET 121 via the amplifier 110.

However, in the load MOS current $i_{MOS}=i_B+i_S=n*m*i_D+i_S$, when the ratio of the current $i_S$ provided by the current source 53 is made larger than the boost current $i_B=n*m*i_D$, the influence of the variation of the reference voltage VREF can be reduced to a negligible order.

Further, in FIG. 15, a voltage of an end (the other end) of the capacitor 101, which is not connected to the VSL 42, that is, a voltage of the output terminal 102A of the low-impedance circuit 102 is smaller than the reference voltage VREF by a voltage $V_{GS}$ between the gate and the source of the FET 121.

So, in FIG. 15, in order that a voltage of the end of the capacitor 101, which is not connected to the VSL 42, that is, a voltage of the output terminal 102A of the low-impedance circuit 102 is made equal to that of the case of FIG. 10, it is necessary to adjust the reference voltage VREF.

However, in FIG. 15, the voltage of the end of the capacitor 101, which is not connected to the VSL 42, is not necessarily made equal to that of the case of FIG. 10 and can be set roughly.

The current control mechanism 54 of FIG. 15 has a capability that is almost the same as that of the current control mechanism 54 of FIG. 10. According to the current control mechanism 54 of FIG. 15, it is possible to reduce consumption current and a mounting area more than those of the current control mechanism 54 of FIG. 10 by an amount corresponding to the absence of the amplifier 110.

It should be noted that in the current control mechanism 54 of FIG. 15, the current source 161 that extracts a predetermined current $i_1$ from the current $i_B'=m*i_D$ of the FET 142 as the mirror destination of the m-fold current mirror can be provided as in the case of FIG. 12.

As described above, in the current control mechanism 54, in the low-impedance circuit 102 having one end that is connected to the other end of the capacitor 101 connected to the VSL 42, the current $i_C$ flowing in the capacitor 101 is detected and the boost current $i_B$ as a current corresponding to the current $i_C$ flowing in the capacitor 101 is provided to the VSL 42. Thus, the change rate of the VSL voltage is detected as the current $i_C$ flowing in the capacitor 101, and the load MOS current $i_{MOS}$ is increased by the boost current $i_B$ corresponding to the current $i_C$. As a result, the VSL settling time can be shortened and the speedup of the image sensor 2 can be achieved.

Further, since the boost current $i_B$ corresponding to the current $i_C$ flowing in the capacitor 101 is generated by the two current mirrors of the m-fold current mirror and the n-fold current mirror, the capacitance of the capacitor 101, which is used for obtaining a necessary boost current $i_B$, can be made small.

As a result, according to the current control mechanism 54, it is possible to achieve the speedup of the image sensor 2 while suppressing the increase in mounting area.

As the number of pixels of the image sensor 2 and thus an angle of view become larger, the parasitic capacitance $C_P$ of the VSL 42 becomes larger, while a proportion of the mounting area of the current control mechanism 54 to the mounting area of the image sensor 2 becomes smaller (area penalty of the current control mechanism 54 becomes smaller). Thus, the effectiveness of providing the current control mechanism 54 increases.

It should be noted that the embodiment of the present disclosure is not limited to the embodiment described above and can be variously modified without departing from the gist of the present disclosure.

Further, the present disclosure can be applied to, in addition to the digital camera, a PC (Personal Computer), a mobile phone, a tablet terminal, a smartphone, a wearable camera, and any other electronic apparatuses capable of implementing a function of capturing images.

Furthermore, the effects described in this specification are mere exemplary ones and are not limitative, and other effects may be produced.

It should be noted that the present disclosure can have the following configurations.

(1) An image sensor, including:
a capacitor including one end connected to a vertical signal line and the other end;
a low-impedance virtual battery connected to the other end of the capacitor and configured to detect a current flowing in the capacitor; and
a boost current source configured to provide a boost current to the vertical signal line, the boost current being a current corresponding to the current flowing in the capacitor.

(2) The image sensor according to (1), in which
the virtual battery includes a field effect transistor (FET) of a source follower,
the other end of the capacitor is connected to a source of the FET of the source follower, and
the source of the FET of the source follower is connected to a source follower current source.

(3) The image sensor according to (2), further including:
a first current mirror including a mirror source in which a drain current of the FET of the source follower flows; and
a second current mirror including a mirror source in which a current of a mirror destination of the first current mirror flows, in which
the boost current source is a transistor of a mirror destination of the second current mirror.

(4) The image sensor according to (3), further including an extraction current source configured to extract a predetermined current from the current of the mirror destination of the first current mirror.

(5) The image sensor according to (3) or (4), in which
a current corresponding to a change rate of a voltage of the vertical signal line flows in the capacitor,
a current corresponding to the current flowing in the capacitor flows as the drain current of the FET of the source follower,
a current that is m times as large as the drain current of the FET of the source follower flows in the mirror destination of the first current mirror, and
a current that is n times as large as the current flowing in the mirror destination of the first current mirror flows in the mirror destination of the second current mirror as the boost current source.

(6) The image sensor according to any one of (2) to (5), in which
an output of an amplifier to which a predetermined voltage is input is applied to a gate of the FET of the source follower.

(7) The image sensor according to (6), in which
the amplifier is shared by all columns of pixels of the image sensor.

(8) The image sensor according to (6), in which
the virtual battery further includes the amplifier.

(9) The image sensor according to (8), in which
the amplifier includes
a differential pair,
a current mirror connected to the differential pair, and
a constant current source configured to change a current flowing in the differential pair into a constant current,
the amplifier including
an output terminal connected to the gate of the FET of the source follower,
an inverting input terminal connected to the source of the FET of the source follower, and a non-inverting input terminal to which the predetermined voltage is applied.

(10) A driving method for an image sensor, the image sensor including a capacitor including one end connected to a vertical signal line and the other end, and a low-impedance virtual battery connected to the other end of the capacitor and configured to detect a current flowing in the capacitor,
the driving method including
providing a boost current to the vertical signal line, the boost current being a current corresponding to the current flowing in the capacitor.

(11) An electronic apparatus, including:
an optical system configured to condense light; and
an image sensor configured to receive light and capture an image, the image sensor including
a capacitor including one end connected to a vertical signal line and the other end,
a low-impedance virtual battery connected to the other end of the capacitor and configured to detect a current flowing in the capacitor, and
a boost current source configured to provide a boost current to the vertical signal line, the boost current being a current corresponding to the current flowing in the capacitor.

It should be understood by those skilled in the art that various modifications, combinations, sub-combinations and alterations may occur depending on design requirements and other factors insofar as they are within the scope of the appended claims or the equivalents thereof.

What is claimed is:

1. An image sensor, comprising:
a capacitor including one end connected to a vertical signal line and another end;
a low-impedance virtual battery connected to the other end of the capacitor and configured to detect a current flowing in the capacitor; and
a boost current source configured to provide a boost current to the vertical signal line, the boost current being a current corresponding to the current flowing in the capacitor.

2. The image sensor according to claim 1, wherein
the virtual battery includes a field effect transistor (FET) of a source follower,
the other end of the capacitor is connected to a source of the FET of the source follower, and
the source of the FET of the source follower is connected to a source follower current source.

3. The image sensor according to claim 2, further comprising:
a first current mirror including a mirror source in which a drain current of the FET of the source follower flows; and
a second current mirror including a mirror source in which a current of a mirror destination of the first current mirror flows, wherein
the boost current source is a transistor of a mirror destination of the second current mirror.

4. The image sensor according to claim 3, further comprising an extraction current source configured to extract a predetermined current from the current of the mirror destination of the first current mirror.

5. The image sensor according to claim 3, wherein
a current corresponding to a change rate of a voltage of the vertical signal line flows in the capacitor,
a current corresponding to the current flowing in the capacitor flows as the drain current of the FET of the source follower,
a current that is m times as large as the drain current of the FET of the source follower flows in the mirror destination of the first current mirror, and
a current that is n times as large as the current flowing in the mirror destination of the first current mirror flows in a mirror destination of the second current mirror as the boost current source.

6. The image sensor according to claim 4, wherein
an output of an amplifier to which a predetermined voltage is input is applied to a gate of the FET of the source follower.

7. The image sensor according to claim 6, wherein
the amplifier is shared by all columns of pixels of the image sensor.

8. The image sensor according to claim 6, wherein
the virtual battery further includes the amplifier.

9. The image sensor according to claim 8, wherein
the amplifier includes
a differential pair,
a current mirror connected to the differential pair, and
a constant current source configured to change a current flowing in the differential pair into a constant current,
the amplifier including
an output terminal connected to the gate of the FET of the source follower,
an inverting input terminal connected to the source of the FET of the source follower, and
a non-inverting input terminal to which the predetermined voltage is applied.

10. A driving method for an image sensor, the image sensor including a capacitor including one end connected to a vertical signal line and another end, and a low-impedance virtual battery connected to the other end of the capacitor and configured to detect a current flowing in the capacitor,
the driving method comprising
providing a boost current to the vertical signal line, the boost current being a current corresponding to the current flowing in the capacitor.

11. An electronic apparatus, comprising:
an optical system configured to condense light; and
an image sensor configured to receive light and capture an image, the image sensor including
a capacitor including one end connected to a vertical signal line another other end,
a low-impedance virtual battery connected to the other end of the capacitor and configured to detect a current flowing in the capacitor, and
a boost current source configured to provide a boost current to the vertical signal line, the boost current being a current corresponding to the current flowing in the capacitor.

* * * * *